US 11,126,858 B2

(12) United States Patent
Gunawardena

(10) Patent No.: US 11,126,858 B2
(45) Date of Patent: Sep. 21, 2021

(54) SYSTEM AND METHOD FOR MACHINE-ASSISTED SEGMENTATION OF VIDEO COLLECTIONS

(71) Applicant: The Trustees of Princeton University, Princeton, NJ (US)

(72) Inventor: Ananda Gunawardena, Newtown, PA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 17/016,520

(22) Filed: Sep. 10, 2020

(65) Prior Publication Data

US 2021/0110166 A1    Apr. 15, 2021

Related U.S. Application Data

(63) Continuation of application No. 16/594,510, filed on Oct. 7, 2019, now Pat. No. 10,810,436.

(60) Provisional application No. 62/742,583, filed on Oct. 8, 2018.

(51) Int. Cl.
| | |
|---|---|
| *H04N 9/80* | (2006.01) |
| *G06K 9/00* | (2006.01) |
| *G06F 16/783* | (2019.01) |
| *G06F 16/75* | (2019.01) |
| *G06F 16/732* | (2019.01) |

(52) U.S. Cl.
CPC ..... *G06K 9/00765* (2013.01); *G06F 16/7328* (2019.01); *G06F 16/75* (2019.01); *G06F 16/7844* (2019.01); *G06K 9/00751* (2013.01)

(58) Field of Classification Search
CPC ............. G06K 9/6267; G06K 9/00751; G06K 9/00765; G06F 16/7844; G06F 16/75; G06F 16/7328
USPC ........ 386/241, 239, 243, 245, 248, 278, 246
See application file for complete search history.

(56) References Cited

U.S. PATENT DOCUMENTS

| | | | |
|---|---|---|---|
| 10,061,756 B2 | 8/2018 | Gunawardena et al. | |
| 10,127,824 B2 | 11/2018 | Yadav et al. | |
| 10,311,454 B2 | 6/2019 | McCord | |
| 10,419,790 B2 | 9/2019 | Gersten | |
| 2008/0066136 A1* | 3/2008 | Dorai | G06F 16/7834 725/135 |
| 2013/0080611 A1* | 3/2013 | Li | H04N 21/222 709/223 |
| 2016/0307044 A1 | 10/2016 | Marilly et al. | |
| 2019/0266912 A1* | 8/2019 | Barzman | G09B 7/00 |

OTHER PUBLICATIONS

Bargotta et al. "Using Real-Time Video Analytics To Improve Instruction", International Journal on Innovations in Online Education 2(3) 2018.

(Continued)

*Primary Examiner* — Robert Chevalier
(74) *Attorney, Agent, or Firm* — Meagher Emanuel Laks Goldberg & Liao, LLP

(57) ABSTRACT

According to various embodiments, a system for accessing video content is disclosed. The system includes one or processors on a video hosting platform for hosting the video content, where the processors are configured to generate an automated transcription of the video content and apply text clustering modules based on a trained neural network to segment the video content.

20 Claims, 35 Drawing Sheets

(56) References Cited

OTHER PUBLICATIONS

David M. Blei "Probabilistic Topic Models", Communications of the ACM, vol. 55, No. 4, Apr. 2012.
Ceme et al. "Determining Semantic Similarity through Source-Driven Context", Independent Work Report Fall 2014.
Gunawardena "From Data to Insights in CS1", ITiCSE '19, Aberdeen, Scotland, UK, Jul. 15-17, 2019.
Koshorek et al. "Text Segmentation as a Supervised Learning Task", Proceedings of NAACL-HLT 2018, pp. 469-473, New Orleans, Louisiana, Jun. 1-6, 2018.
Ragy Morkos "Automatic Punctuation of lecture Transcripts & Student Usage Analysis of Video Lectures in Online Learning Platforms", Senor Thesis Final Report 2017/2018, Princeton University, Department of Computer Science.

* cited by examiner

SYSTEM AND METHOD FOR MACHINE-ASSISTED SEGMENTATION OF VIDEO COLLECTIONS

CROSS-REFERENCE TO RELATED APPLICATIONS

This application is a continuation of U.S. application Ser. No. 16/594,510 filed Oct. 7, 2019 which claims priority to provisional application 62/742,583, filed Oct. 8, 2018, which is herein incorporated by reference in its entirety.

FIELD OF THE INVENTION

The present invention relates generally to machine learning and, more particularly, to a system and method for training and applying machine assisted technologies to automatically transcribe, punctuate, and cluster video segments.

BACKGROUND OF THE INVENTION

The traditional instructional model for large lectures (for instance, student enrollment greater than 150 students) typically involves two lectures per week followed by small group meetings called precepts or recitations. The traditional lecture model is an ineffective way to deliver instructions when class sizes are large. As enrollments continue to grow, the need for automated tools to manage large class sizes become critical.

The use of well-produced videos is increasingly becoming popular as the visual and audio components of a video engage users more with content than traditional text-based material or large-sized lectures. In traditional education, the video collections are beginning to replace or reduce the use of textbooks. In massive open online courses (MOOCs), videos are the primary mode of instruction delivery. Outside of education, for instance in corporate training, videos are increasingly used to deliver quick training material required for employee onboarding and continuing education. In other applications of videos, most products that typically require pre-assembly now have accompanying user guides delivered in video format. Despite the increase in video usage for instruction and other areas in business, smart search within a video remains a difficult problem. The manual indexing of the video is an expensive and unsustainable process.

As such, there is a need for an automated system and method for video indexing to allow for any well-produced video to be searched quickly and efficiently.

SUMMARY OF THE INVENTION

According to various embodiments, a method for accessing video content is disclosed. The method includes generating an automated transcription of the video content and applying text clustering modules based on a trained neural network and machine assisted methods to segment the video content.

According to various embodiments, a system for accessing video content is disclosed. The system includes one or processors on a video hosting platform for hosting the video content, where the processors are configured to generate an automated transcription of the video content and apply text clustering modules based on a trained neural network and machine assisted methods to segment the video content.

According to various embodiments, a non-transitory computer-readable medium having stored thereon a computer program for execution by a processor configured to perform a method for accessing video content is disclosed. The method includes generating an automated transcription of the video content and applying text clustering modules based on a trained neural network and machine assisted methods to segment the video content.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Figure 1:
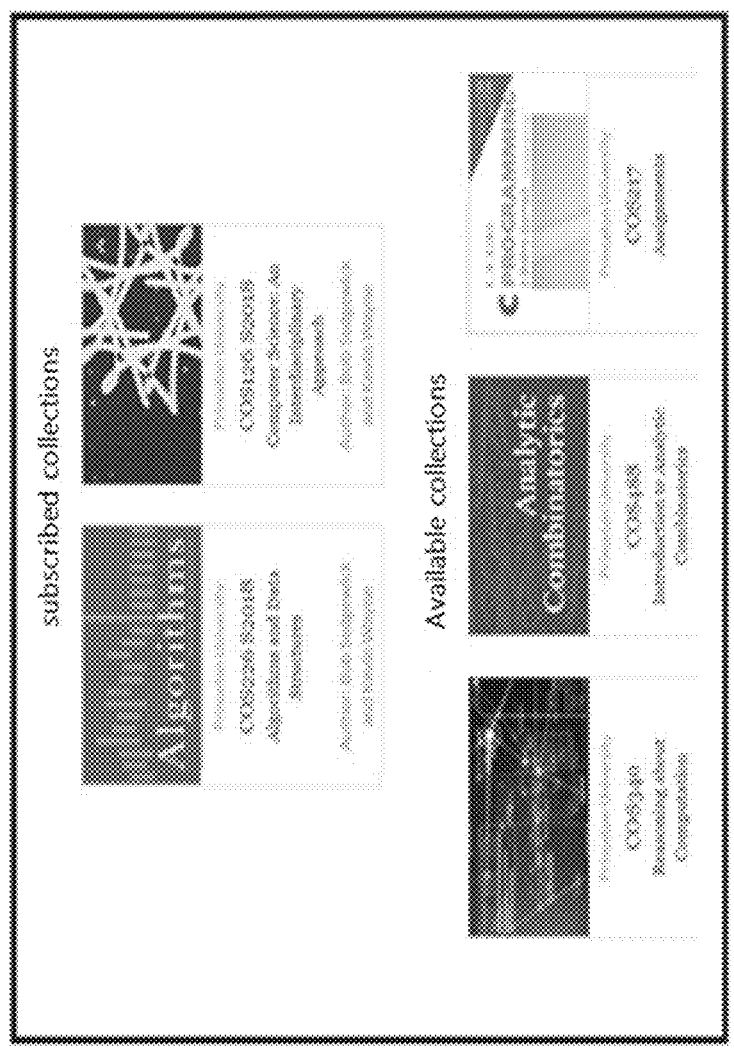
FIG. 1 depicts a screenshot of courses/collections according to an embodiment of the present invention.

The use of instructional videos is on the rise in at least education, training, and customer service. The availability of educational videos in massive open online courses (MOOCs) and in free platforms, such as YouTube as an example, allow users to learn concepts at their own speed or to learn do-it-yourself tasks in a visual environment. An increasing number of instructors are also integrating videos as primary or secondary instructional tools in their educational repertoire. As such, there is an opportunity to provide robust methods and technologies for creating curated and searchable video collections using novel machine assisted methods.

There is also an opportunity to analyze and utilize user interaction data such as video time stamp, playback speed, datetime, among other metrics to improve user experience. The data can also be used to improve the user experience by providing easy video navigation techniques and user dashboards that provide snapshots of user experiences.

Despite the use of course management technologies such as discussion forums, submission systems, automated grading, many courses still do not employ technologies that can provide on-demand instructions and real-time analytics on student performance as a class, a group or as individuals. If real-time analytics are available, students can master concepts they have missed, and instructors can adjust instructional techniques just-in-time to meet the student, group, or class needs. For example, if instructors can visualize what topics are difficult in general for students to comprehend, they can give additional instructions or direct students to find more help on those topics. If instructors know which students are having trouble early on, then they can intervene to provide additional help. However, data-driven teaching and learning is not easy to do in any course. The reasons include, cost of production, privacy and security of data as well as among others, the difficulties in adopting open technologies that provide access to real-time dashboards. Even with current video analytics, there are no easy ways to get granular video user data to help make key teaching and learning decisions. One goal herein was to develop a new user interface technology using videos as the base, to improve the student experience and collect real-time data to help instructors and students get insights into their teaching and learning activities.

Generally disclosed herein is a design, development, and implementation of a novel curated and searchable video platform that allow the distribution of highly interactive videos. A novel user interface is introduced for accessing videos by enabling superior navigation and providing an efficient interface for term, topic or concept search. The platform was tested in large computer science courses resulted in millions of data points of student interactions. It is to be noted that while the embodiments disclosed herein are related to educational videos and student users, they can easily be adopted for other instructional or well-produced videos with any type of user in many common scenarios.

Generally disclosed herein is a system and method for creating an aggregated collection of auto-curated videos that are semantically related. The process or method is similar to creating a playlist and adding metadata to identify collection attributes. The system and method further include creating a sub-collection of videos from the aggregated collection (manual or automated) and includes a process for adding metadata to each sub-collection. The system and method also include adding self-assessment to the collection, identifying the field/discipline of the collection, and using manually punctuated documents from the field of the collection for machine assisted training.

Generally disclosed herein is a system and method for a trained neural network and related machine assisted technologies for each discipline and sub-discipline. The system and method further include using a specific training dataset for each discipline, refining the neural network by tuning hyper-parameters, and retraining the neural network based on new data. The clustering of content is based on punctuation and usage data, initial clustering is based on a novel algorithm for segmentation using punctuations. The system and method further include training a neural network to identify proper segmentation using usage data hotspots and generating a mapping of segments and known queries generated by users of the initial service.

The following design goals are accounted for in developing the technology disclosed herein:

(1) It can be built as an open source software to enable community support to extend the technology beyond its capabilities as necessary.

(2) The system and method can integrate any video, which allows education and non-education users to easily adopt the platform for existing collections of videos. They can use a playlist of videos or upload their own videos to build an automatically curated collection.

(3) All videos are supported by interactive and synchronized text transcripts. The transcripts are automatically generated, punctuated and structured to provide a more interactive experience in a setting that includes audio, visual, and textual components.

(4) Videos are searchable across all collections so that users can find topics of interest quickly. The search is able to produce all matches to a query term, topic, or concept and allow users to jump to the exact location of any video segment at any time stamp.

(5) Real time dashboards are available for all users of the system. The user dashboard serves as a way for a user to know which videos are current, videos they have missed, and their performance on video based self-assessments. The instructor dashboards display real time data such as percentage of students who watched videos and attempted assessments.

(6) The ease of use is a major design goal of the platform. Users can sign up using their google or institutional accounts, and join the collections using a subscription method. The technology is available on any desktop, tablet, or mobile phone platform. There is nothing to install for accessing the system via a web browser or using an application installed on a mobile device.

Features of the system and method will be described below. FIG. 1 depicts that as users log in to the system (using an authentication system), they are able to access the videos related to the courses/collections they are currently interested in as well as collections related to other courses/collections offered by any organization/individual. The term "collection" used herein describes a semantically related video collection. As illustrated, users can access their currents courses/collections (listed under subscribed collections) or access videos of other courses/collections (listed under available collections).

Figure 2:
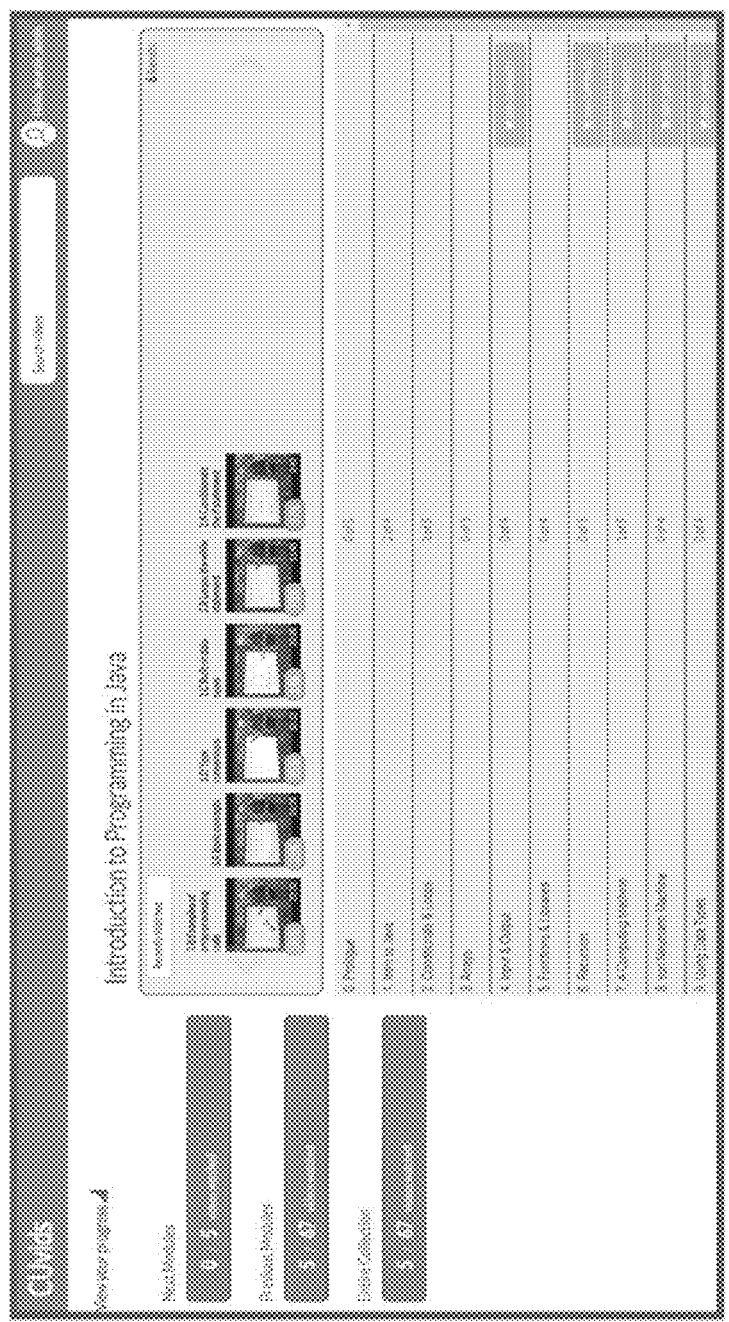
FIG. 2 depicts a screenshot of a specific course video collection according to an embodiment of the present invention.

After choosing a collection, users are directed to the specific collection as depicted in FIG. 2. Here, users have access to a specific course video collection and ways to access videos from other lectures or modules. The left-hand side of the figure shows how many videos of the next lecture/module have been watched as well as previous lectures/modules missed and missed lectures/modules from the entire course/collection.

Each collection includes modules where each module includes a set of short 10-25-minute automatically curated videos. The analogy for a module is a chapter of a textbook. An analogy for a curated video is a section of a textbook. As such, the curated video collections provide an enhanced alternative to traditional textbooks.

As a nonlimiting example, each collection/course can have about 100 short curated videos with a length of about 10-25 minutes. A typical 80 minutes lecture would therefore be splits into 4 to 6 short videos. Users may have the option to watch videos at different speeds to suit their needs.

Figure 3:
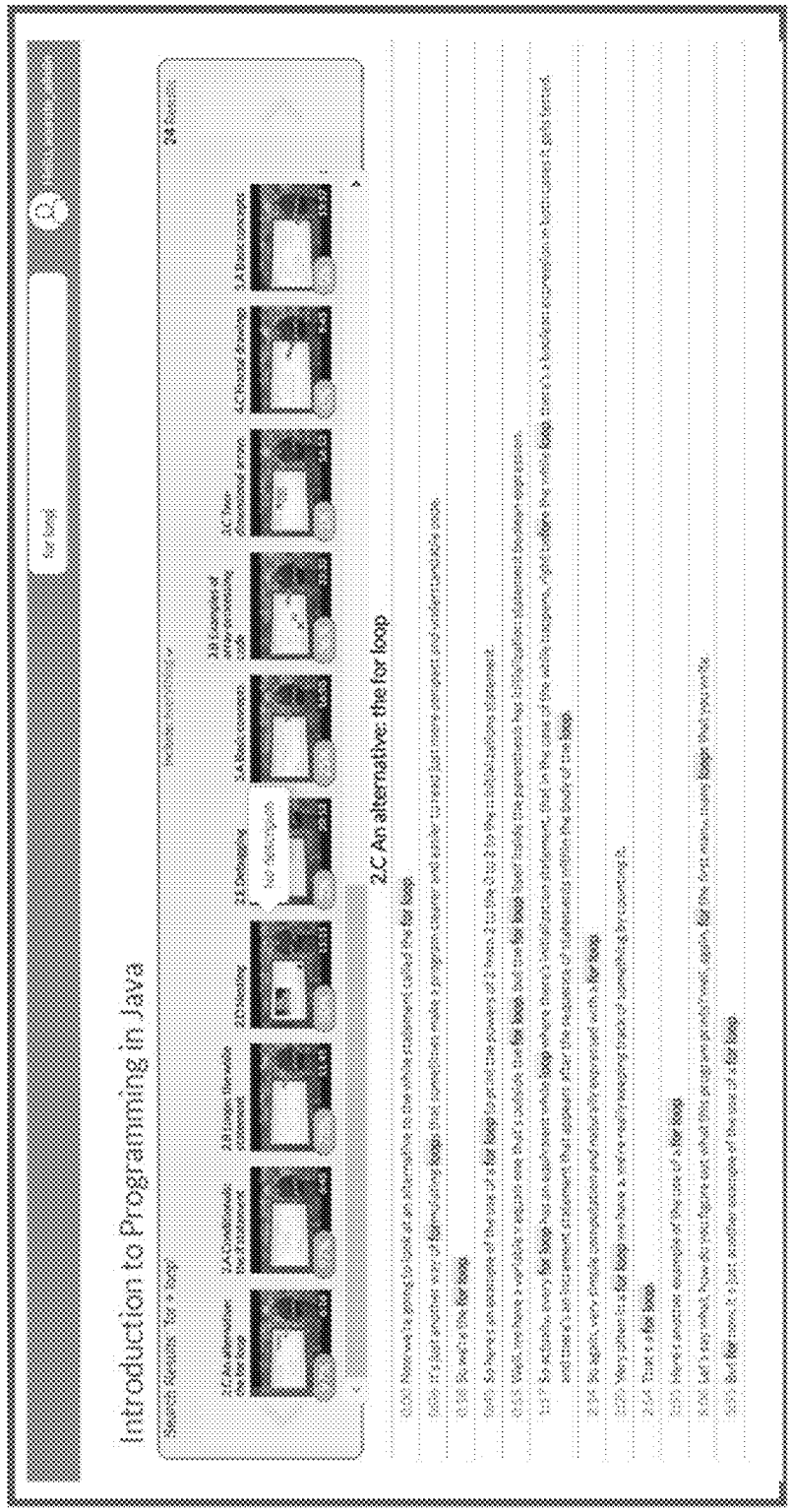
FIG. 3 depicts a screenshot of results of a global query according to an embodiment of the present invention.

Users can also search videos based on a query term. As a nonlimiting example, FIG. 3 depicts the results from a global query as a result of searching over the entire collection using the term "for loop". It is noted that queries can be done across videos (inter) and within video (intra) to find the most closely matched video clip(s). For instance, as shown in FIG. 3, the query resulted in many video clips (shown in the search results), and upon selecting one of the hit videos (2.C An alternative: the for loop), the user can see the locations of that particular video, where the query term appears. This allows users to jump to the exact location of the specific video.

Figure 4:
FIG. 4 depicts a screenshot of results from a global natural language processing (NLP) based query according to an embodiment of the present invention.

Users can also search videos based on a query topic. As a nonlimiting example, FIG. 4 depicts the results from a global Natural Language Processing (NLP) based query as a result of searching over the entire collection using the question "what is compression?". It is noted that NLP queries can be done across videos (inter) and within video (intra) to find the most closely matched video clip(s). For instance, as shown in FIG. 4, the query resulted in matching videos (shown in the search results) with match percentage and sub-clips, and upon selecting one of the hit videos (21.C Huffman compression), the user can see the matching clips of that particular video, where the query topic appears. This allows users to jump to the exact locations of the specific video.

Figure 5:
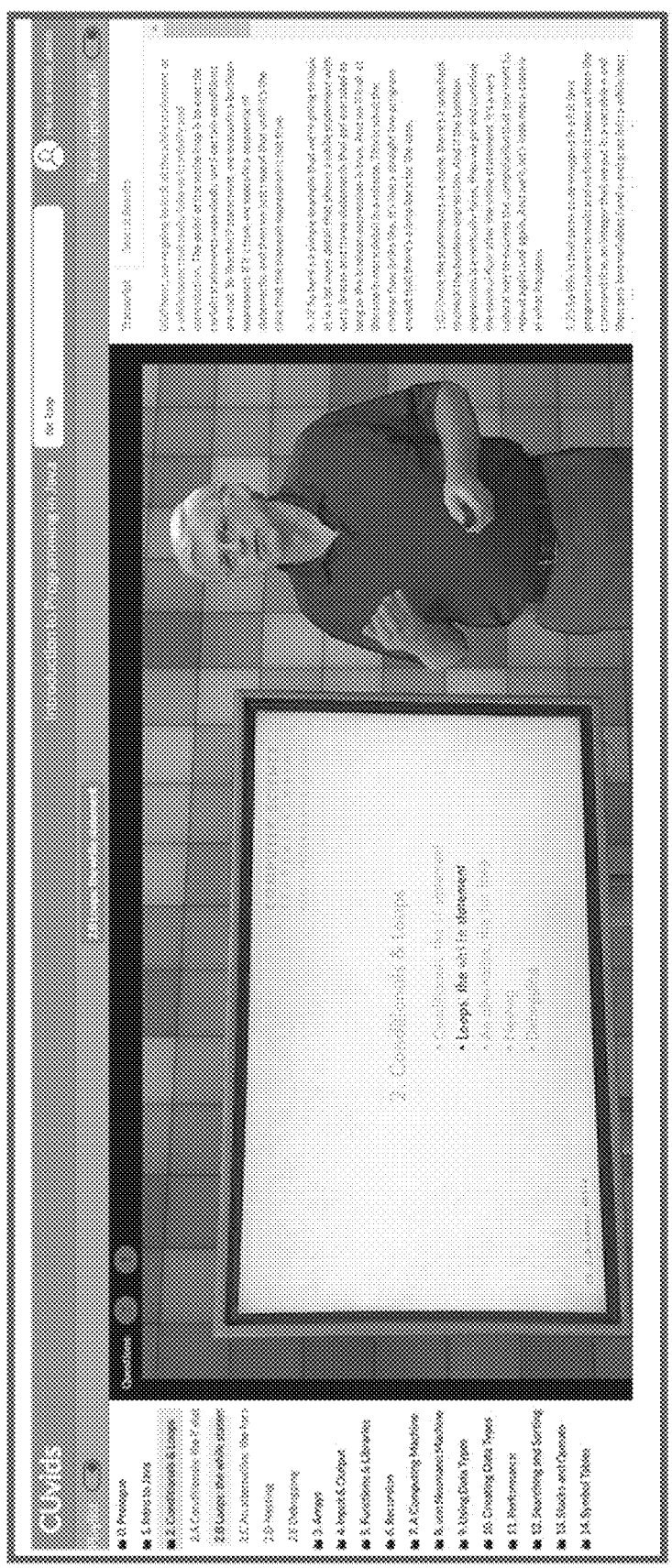
FIG. 5 depicts a screenshot of a user interface for accessing a video view page according to an embodiment of the present invention.

FIG. 5 depicts how users view videos. The view screen is divided into 3 panels. The left panel is the table of contents and allows users to access any video of the collection instantly. The middle panel is the current video where users can use video functionalities, such as setting playback speed, pausing, playing, fast-forwarding, rewinding, etc. as nonlimiting examples. The right panel displays interactive and synchronized transcripts which allow users to see which part of the video is currently playing (by highlighting that section of the transcript). The interactivity of the platform allows users to select any text segment of the audio and jump instantly to that location.

The curated transcripts are segmented to allow users to follow along as the video is playing. A key aspect of transcript integration is to allow users to see "before" and "after" context of the current video segment that is playing. This experience is similar to "reading a textbook" with visibility to context before and after the current focus. This multi-sensory (text, audio, visual) experience allows users to comprehend material quickly with support for different learning styles and backgrounds. The experience is intended to significantly enhance or replace the experience of reading a textbook.

A core concept is the use of data to drive user navigation and course instructions. The data is also helpful to identify students who may be struggling with the course early on. This may be referred to as data driven teaching and learning. This enables opportunities for any instructor to use data to understand student behavior and adjust instructions to maximize teaching and learning outcomes.

Figure 6:
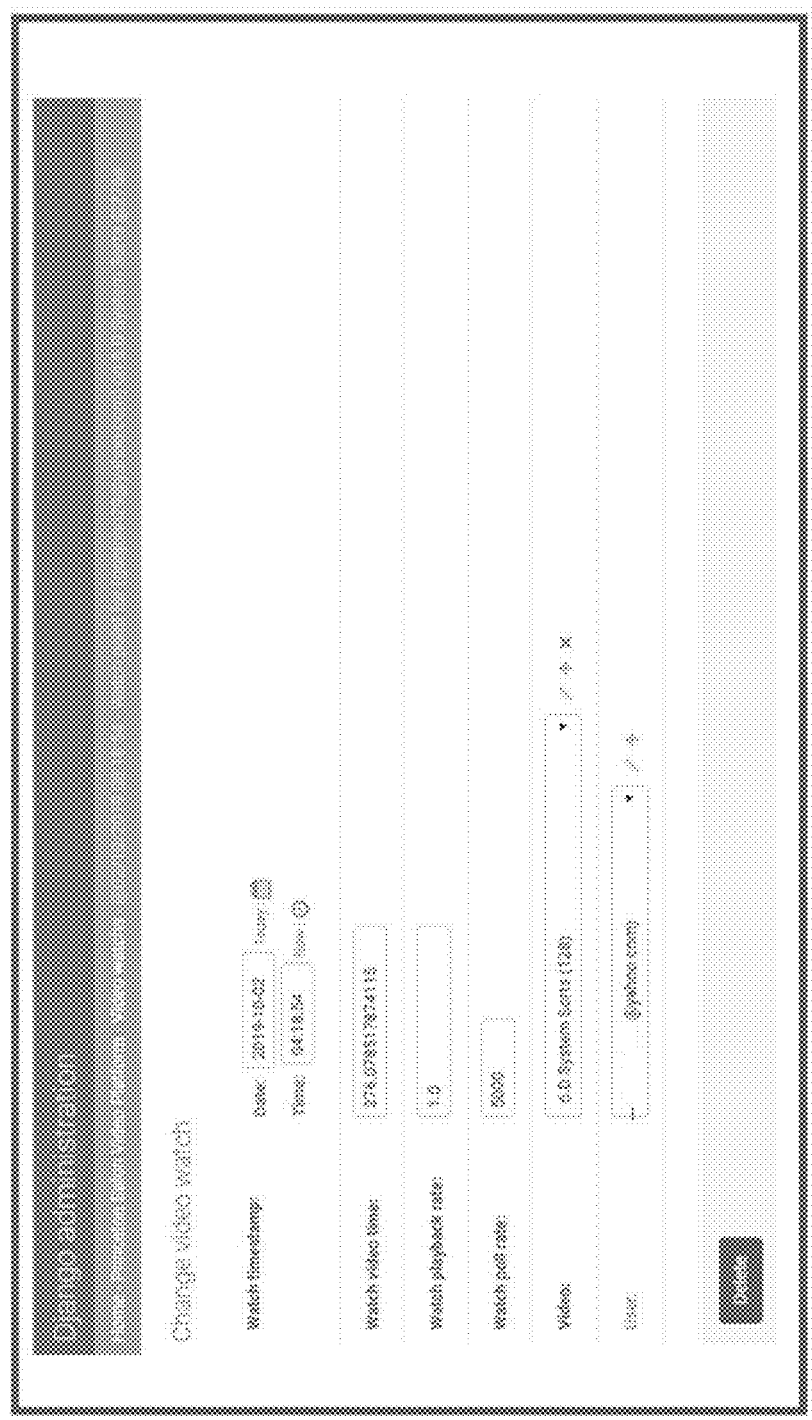
FIG. 6 depicts a screenshot of a high granular data point according to an embodiment of the present invention.

In Fall 2017, over 2.7 million short data records were collected from October to December. Each of these data points is a 5 second granular interaction record that provides highly useful information about user and group behavior. As depicted in FIG. 6, each data point contains that date/time of the activity, the location of the video, the playback rate, user information (not shown), and the specific video the user is accessing. Having 2.7 million such records allows for visualizations that provide insights into user activities, which can lead to both short term and long-term benefits of data-driven teaching and learning activities.

Figure 7:
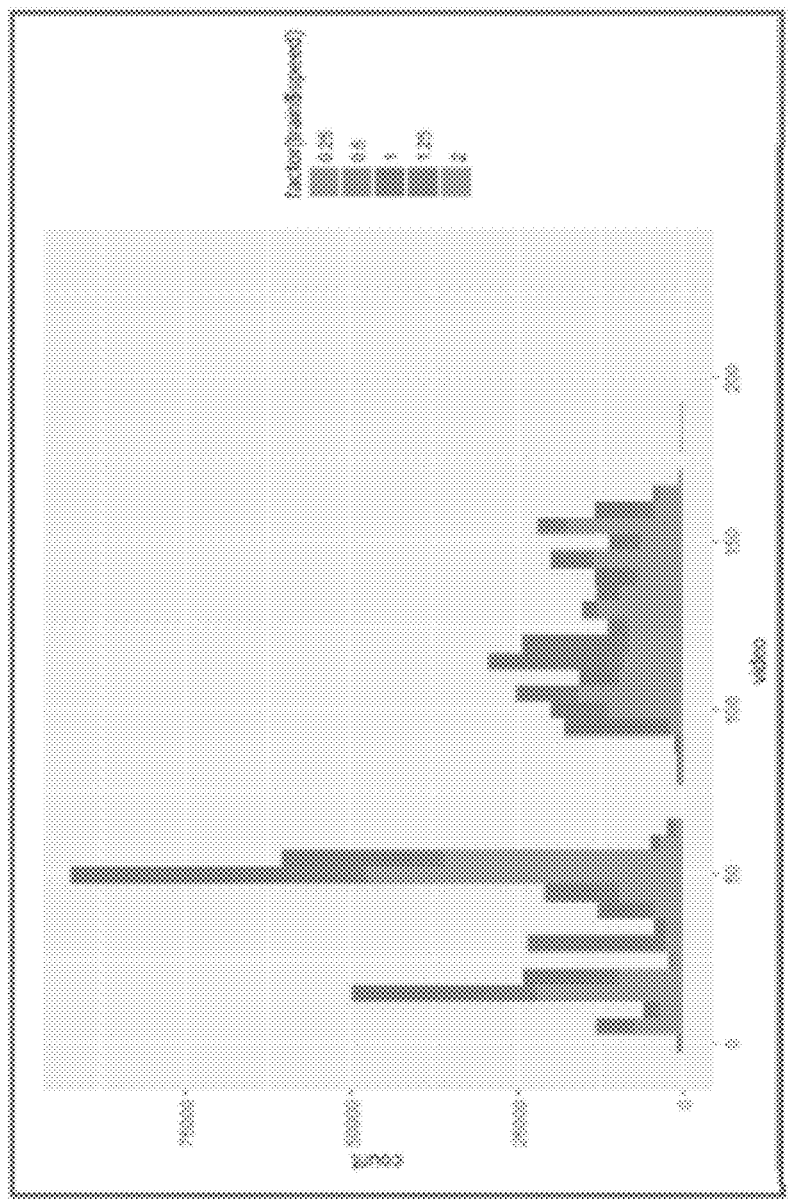
FIG. 7 depicts a graph providing insight into student video access in a collection according to an embodiment of the present invention.

FIG. 7 provides insight into how student access videos. The x-axis is the video ID where videos from 1-97 are from a first course (CS1) and the videos from 98-175 are from a second course (CS2). The y-axis is the count of views. For instance, a count of 75,000 translates to about 104 hours of total video watching time for that specific video. It is to be noted many students are watching videos at 2× speed and such behavior is consistent across all videos in the two collections. This indicates that the standard speed of most videos may be too slow for some students and/or the videos that were watched mostly at high speed at topics that students understand well. This is an insight not available before the implementation of data driven teaching and learning. FIG. 7 also illustrates that there are more video views in CS1 than in CS2. This is likely due to the videos being the primary instructional component in CS1 and a secondary component in CS2. That is, student in CS1 were expected to learn all topics using videos, while students in CS2 only watched videos if they needed more clarification. Although optional, the behavior of CS2 indicates that videos were an important part of the course for most students despite the instructional model.

Figure 8:
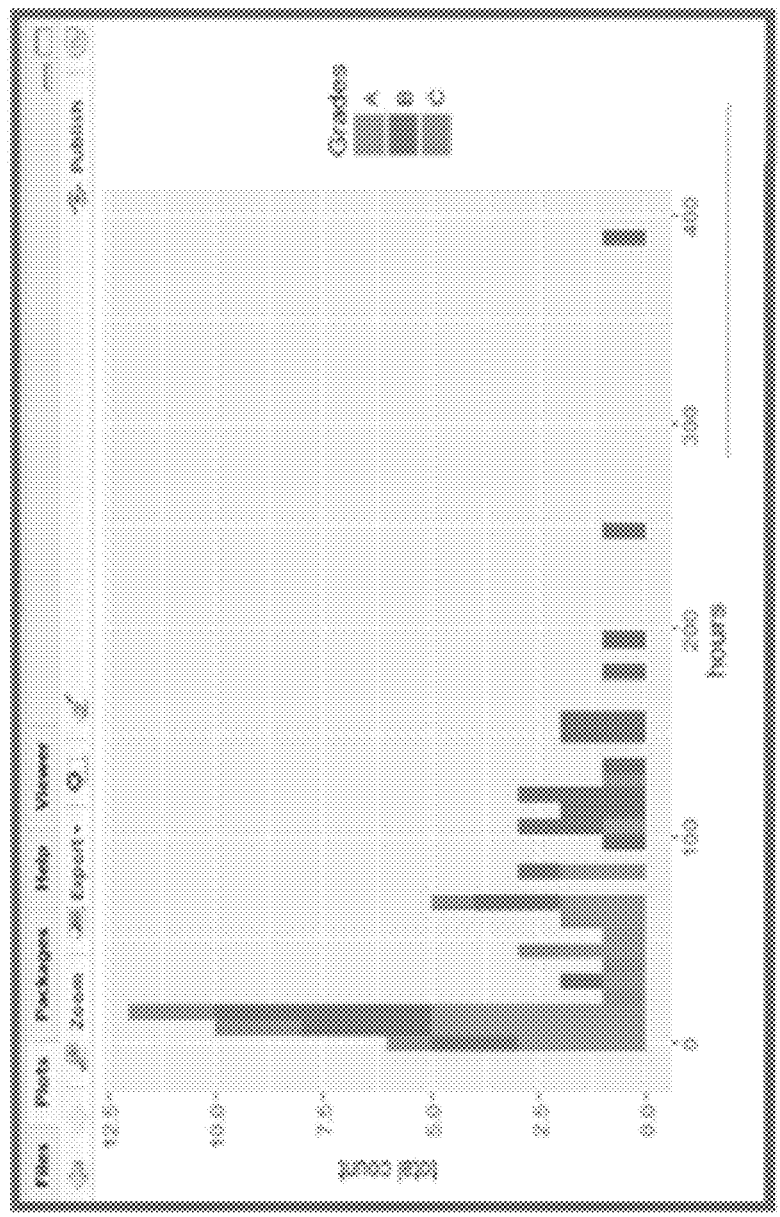
FIG. 8 depicts a graph showing correlation between hours watched, total count, and performance grade according to an embodiment of the present invention.

Another insight is how video watching is related to the grade received in the course. FIG. 8 shows a correlation between hours watched (x-axis) and the total view count (y-axis), and how they are related to the course grade. It appears that 'A' students tend to spend less time with videos than 'B' students. 'C' students tend to spend about the same time as 'A' students. It can be interpreted from this visualization that 'A' students probably do not need to spend as much time as 'B' students as they are fast learners and/or already have some background in the subject while 'B' students tend to be average students who need more time to comprehend the material. The 'C' students are likely not spending enough time watching the videos. Instructors can observe the watching habits of students frequently and combine the data with other factors to decide about when and how to intervene.

Figure 9:
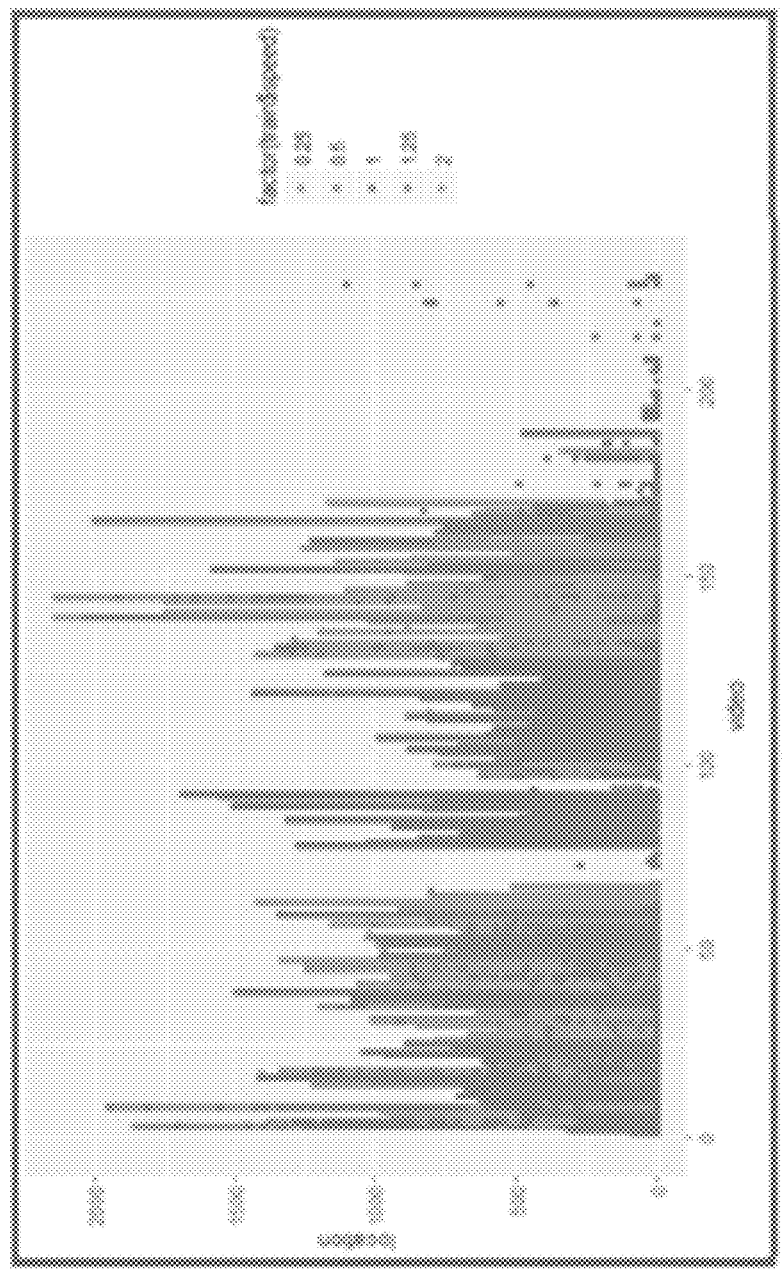
FIG. 9 depicts a graph showing playback speed in a video collection according to an embodiment of the present invention.

How users are watching different parts of each video can also be observed. The inquiry is whether the students generally play videos at the same speed throughout the video or speed up sections, especially when approaching the end. FIG. 9 provides some insight into this question. In FIG. 9, the x-axis is the video ID and the y-axis is the location of the video. For instance, location value 2000 means that it is the $2000^{th}$ second of the video. It is to be noted that the longest video in this collection is slightly above 2000 seconds or about 30+ minutes in length. The shading indicates the speed at which the video is played at a specific time stamp. A few observations can be made from FIG. 9. In CS1 most videos seem to have been played at regular speed while in CS2 early videos were played at regular speed, but later videos were generally played at 2× speed. For the most part, videos were consistently played back at the same speed at all locations. It can be understood that in CS1 students are still learning early concepts in computer science and most student seems to watch videos in standard speed. However, towards the end of the semester (video IDs>60), students in CS1 seem to speed up videos. On the other hand, students in CS2 are more experienced in computer science, but they also start slow and speed up videos towards the latter part of the course. A general observation is that if topics are easier, students tend to speed things up. These visualizations, among others, can give instructors valuable insight into student group behavior.

Figure 10:
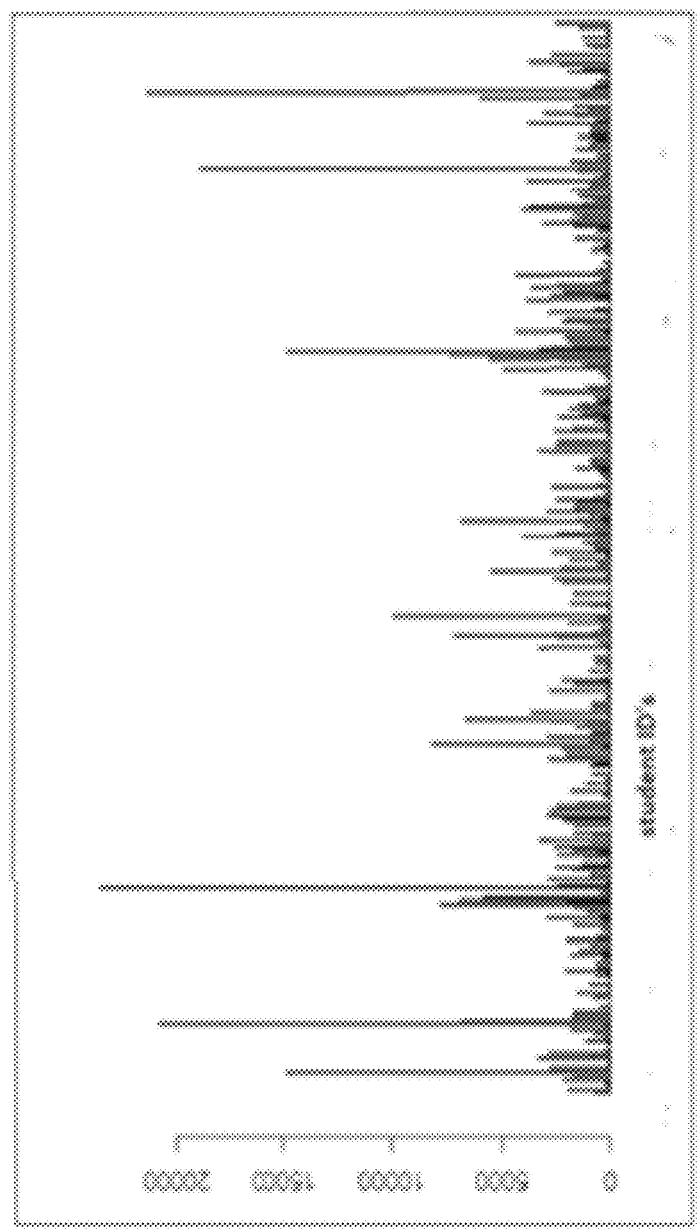
FIG. 10 depicts a graph showing amount of time spent by users watching videos according to an embodiment of the present invention.

Individual student behaviors can also be observed. FIG. 10 illustrates that amount of time each student spends watching videos. The x-axis is the student ID (not shown) and the y-axis is the time spent in views. Some students tend to spend a lot more time than others (high bars). Most students seem to be under 5000 watches. Along with the information in FIG. 8, this can mean students who are spending too much time are perhaps having difficulty with the course. Therefore, it is possible to use some intervention as needed. Though it is to be noted that these observations should be combined with other instructor observations about a student before acting on data. In other words, analytics alone would not be enough to act, but may be used as a trigger to look at other student performance indicators and decide how they can be combined with video data to take proper action.

Figure 11:
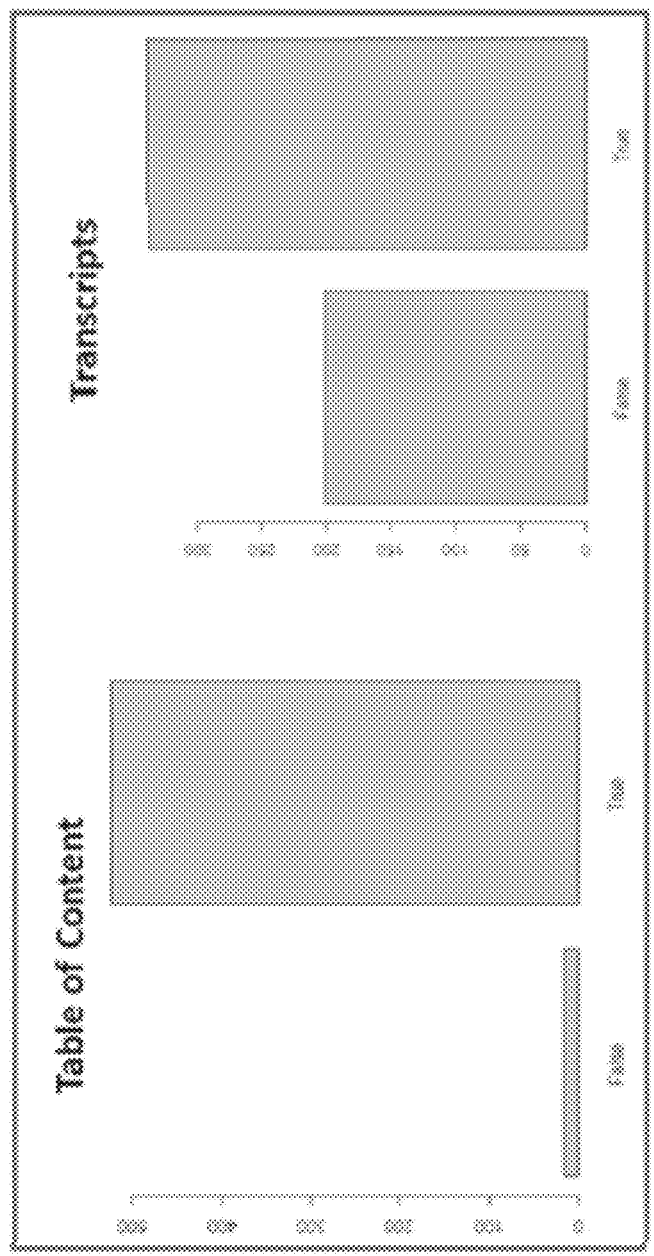
FIG. 11 depicts a graph showing user options for accessing table of content or transcripts according to an embodiment of the present invention.

In addition to the analytics and data available, the platform allows for interactive text that enable students to experience both the video and the accompanying text transcript at the same time. The text transcript is punctuated, segmented and time stamped for easy navigation. The percentage of users who use transcripts as a guide for learning and/or navigation was observed. As shown in FIG. 11, almost all the 500+ users (y-axis) seem to keep the table of content panel open for easy navigation. However, the proportion of students keeping the transcripts panel open were around 3:2. That is, about 60% of the students kept the transcripts open. Therefore, one may conclude that 60% of the students are typically guided by transcripts and/or are using inter or intra video search to find places of interest. This indicates that adding more innovative ideas to the text transcript to improve reading comprehension to the design is perhaps a worthy effort.

The use of technology is a necessary component in today's classrooms and in workplaces. Most courses today use some form of technologies to deliver instructions and assess students. Most companies use videos as training material or for customer service. The classroom instructions are typically delivered using a course management system (CMS) such as Blackboard, Canvas, Moodle or other. Instructors also use variety of tools such as videos, animations, virtual reality (VR), augmented reality (AR), and other technologies in their courses. All of these tools are expected to increase student engagement in the course. However, it is also recognized that educational technology systems frequently produce large amounts of data. By adopting technologies with open Application Programmer Interfaces (API), the data can be exported as CSV/Excel files and can be used to perform analysis that may provide insights into user behavior. The behavior data can be used to design courses to increase instructional effectiveness and student outcomes.

The following is a set of general guidelines for creating data-driven courses for education or training.

1. Adopt visual technologies such as videos to increase user engagement.

2. Redesign or rethink existing courses or training modules to see how to integrate the visual components as primary or secondary instructional components of the course or training.

3. Introduce self-assessment activities such as embedded quizzes to each video to increase user engagement.

4. Design instructional strategies (before, during or after class or training) to engage users with visual learning.

5. Use data frequently to adjust instructions/training or to intervene with users who may be having difficulty keeping up.

6. Use data to guide teaching, learning and training, but avoid using access data as an assessment instrument to help increase user engagement.

As such, generally disclosed herein is a redesign of a course to address scale and academic diversity of participants by using new methods, technology, and actionable analytics. The methods used in computer science discipline is equally applicable to any course in any discipline, when there is a video collection to support instructions or training. The new interactive video technologies and deployment to 1500+ users generated data that were not seen before. The analysis of this data yielded many important observations on collective user behavior that would have not been possible without the use of this technology.

Further generally disclosed herein is an automated solution for the problem of un-curated Automatic Speech Recognition (ASR) transcripts followed by segmentation of meaningful video clips that enhances the utility of the video. Through the training and custom tuning of a bidirectional recurrent neural network on manually punctuated lecture transcripts, it is possible to add punctuation to the transcripts with an overall F-score accuracy of 80% in highly technical areas. In some cases, up to 90% accuracy can be reached and the rest can be adjusted manually while the transcripts are being deployed.

Figure 12:
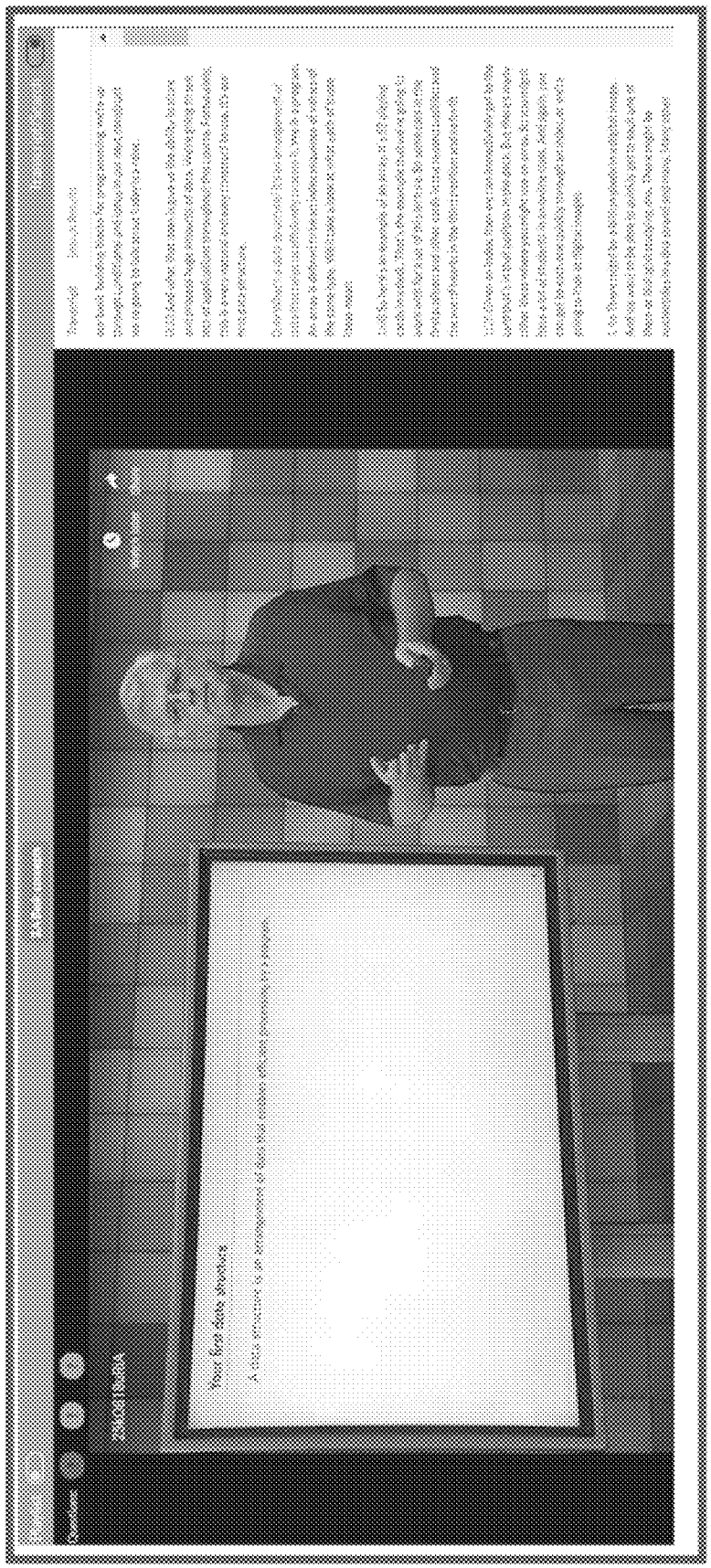
FIG. 12 depicts a screenshot of a transcripted and segmented video according to an embodiment of the present invention.

The second stage of the transcript processing is the clustering of related content using punctuated transcripts. The punctuated transcripts provide the clear bounds of meaningful sentences. Using natural language processing (NLP) methods, sentences are then clustered into meaningful video segments that are in length 2-5 minutes. In the process of segmentation, the semantic structure of the text and the context under which the video was produced is exploited. FIG. 12 provides a depiction of the transcripted and segmented videos. The segmentation method works well for videos that already have a structure present and are of length over 10 minutes, though that is not intended to be limiting. The original clustering of the video segments is based on a methodology that identifies a context or tone change in the text from a clustered paragraph to another. This allows the grouping of several small segments (less than 1 minute long) to 2-5-minute-long segments.

Also disclosed herein is a system and method for smart segmentation of the punctuated text into semantically related components. The methodology clusters related video frames into single sub-videos without having to physically edit the videos. The system maintains an indexed search engine to map sub-video metadata into multiple video collections.

Although one copy of the original video exists in the database, multiple segments of the video can be integrated into different collections using the metadata mapping system. The new system significantly improves the current capabilities of managing video collections by removing redundancy and improving the utility of the video components. The following steps generally describes the methodology.

1. Scraping ASR generated transcripts from videos/channels
2. Removing non-English transcripts
3. Removing timestamps from transcripts
4. Adding new tokens for identifying punctuations in the training set
5. Training a recurrent bidirectional neural network to generate a transcript punctuating model in the specific training discipline.
6. Punctuating raw transcripts and timestamp restoration
7. Aggregation of punctuated transcripts using NLP to define primary clusters
8. Integration of transcript annotation tools to receive human input
9. Generation of metadata for each primary cluster
10. Indexing each cluster in a search database
11. Building video navigation, video view, and transcript annotation engine
12. Improving clusters of the video based on user input This general methodology will be described in greater detail below.

Figure 13:
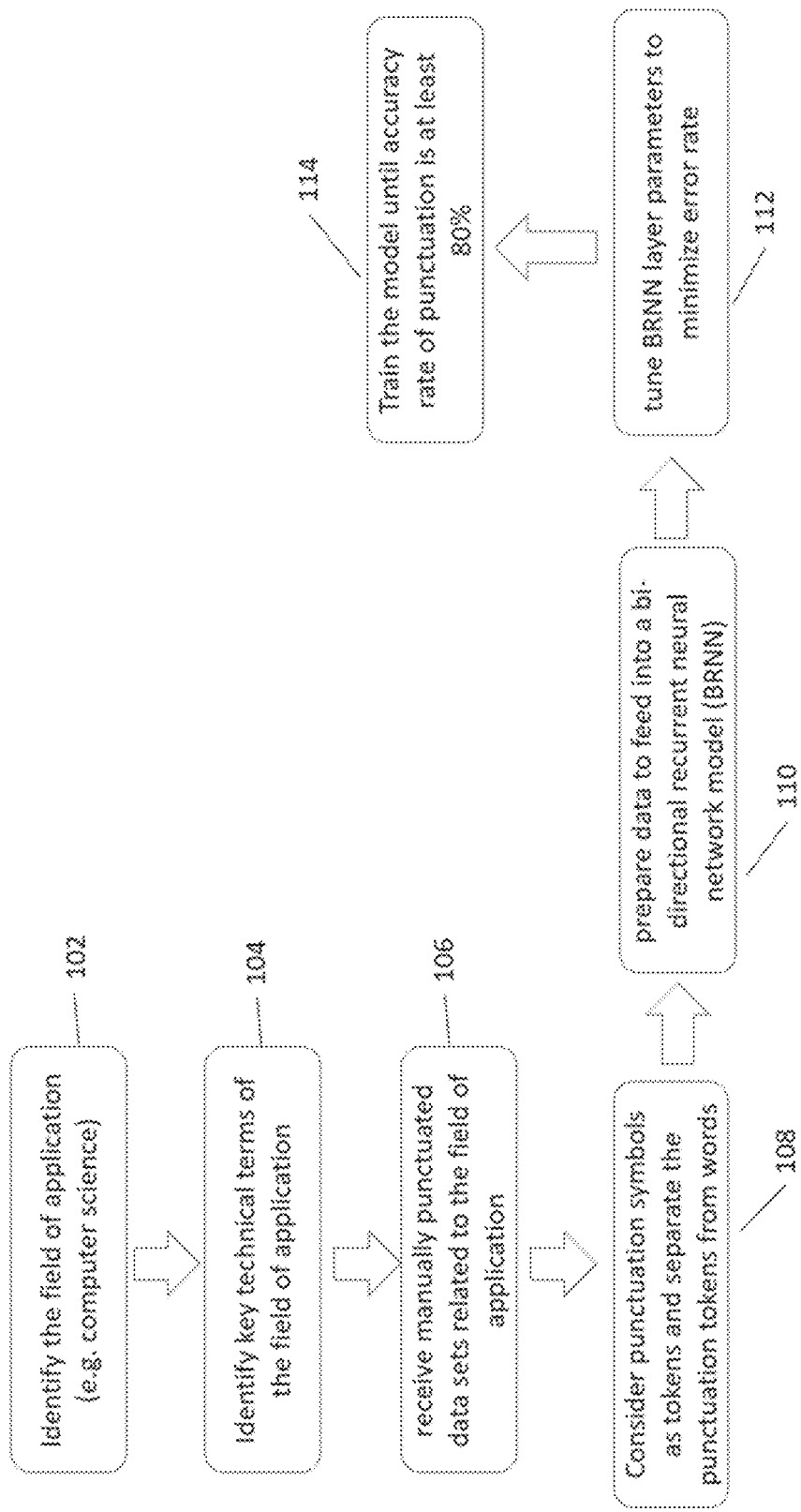
FIG. 13 depicts a flowchart for a first part of a machine assisted training process for punctuation according to an embodiment of the present invention.

FIG. 13 depicts a first stage of a machine assisted training process for punctuation. The process begins at step 102 with identifying the field of application and all its sub-fields. For example, computer science would be a field of application with algorithms, systems, AI as some examples of sub-fields. The narrow focus on the field of application or discipline is significant to the accuracy of the trained binary module used for automatic punctuation.

The next step 104 is to identify key technical terms (or main keywords) in the field of application. This further includes identifying online sources of manually punctuated text in the field of application and its sub-fields and recording all URL's of those locations.

The next step 106 involves using machine assisted methods and customized scripts to extract manually punctuated transcripts in the field of application and its subfields from the recorded URL's. All non-English (or any non-base language) transcripts are removed from the corpus of transcripts obtained using the machine assisted methods such that only the English (or base language) transcripts are used for training. All time stamps are also removed from the downloaded, manually punctuated transcripts in the field of application.

At step 108, all punctuation in the manually punctuated transcripts are replaced with custom tokens. As a nonlimiting example, a (,) would be replaced by ,COMMA and a (.) would be replaced by the text.PERIOD such that the input punctuated transcript may have the following format: "to be ,COMMA or not to be ,COMMA that is the question .PERIOD". All text is converted in the transcript into lower case characters, except the automatically inserted customized tokens (e.g. ,COMMA, .PERIOD).

Next at step 110, a high-performance computing cluster with dedicated computation resources is located for training the punctuation methodology in the field of application. The necessary background software is installed for supporting machine assisted training methods (for example, NumPy, Theano, and/or Python). The pre-modeled neural network binary infrastructure is also installed. Then, training is commenced with a bi-directional recurrent neural network (BRNN) with predetermined number of training models, hidden layers, a desired learning rate, and the manually punctuated and modified data set.

At step 112 the system runs the training methodology until a desired accuracy is obtained. As a non-limiting example, the hyper parameters of the training model such as data size, number of hidden layers, and learning rate are modified as the prior step is repeated in order to minimize the error rate.

At step 114, the model is trained by repeated the prior two steps until an accuracy rate of punctuation is high enough, at least 80% for example. Then the trained model binary file is received to be used for automated punctuation. The unpunctuated transcript file is processed with the trained binary model to obtain a file with punctuated tokens. The punctuated tokens are replaced with their corresponding punctuation marks. The original time stamps are added to automatically punctuated transcripts. The timed sentences are grouped into timed clusters (or paragraphs), to be described further below, and fed into a curated video delivery platform (cuvids.io as a nonlimiting example).

Figure 14:
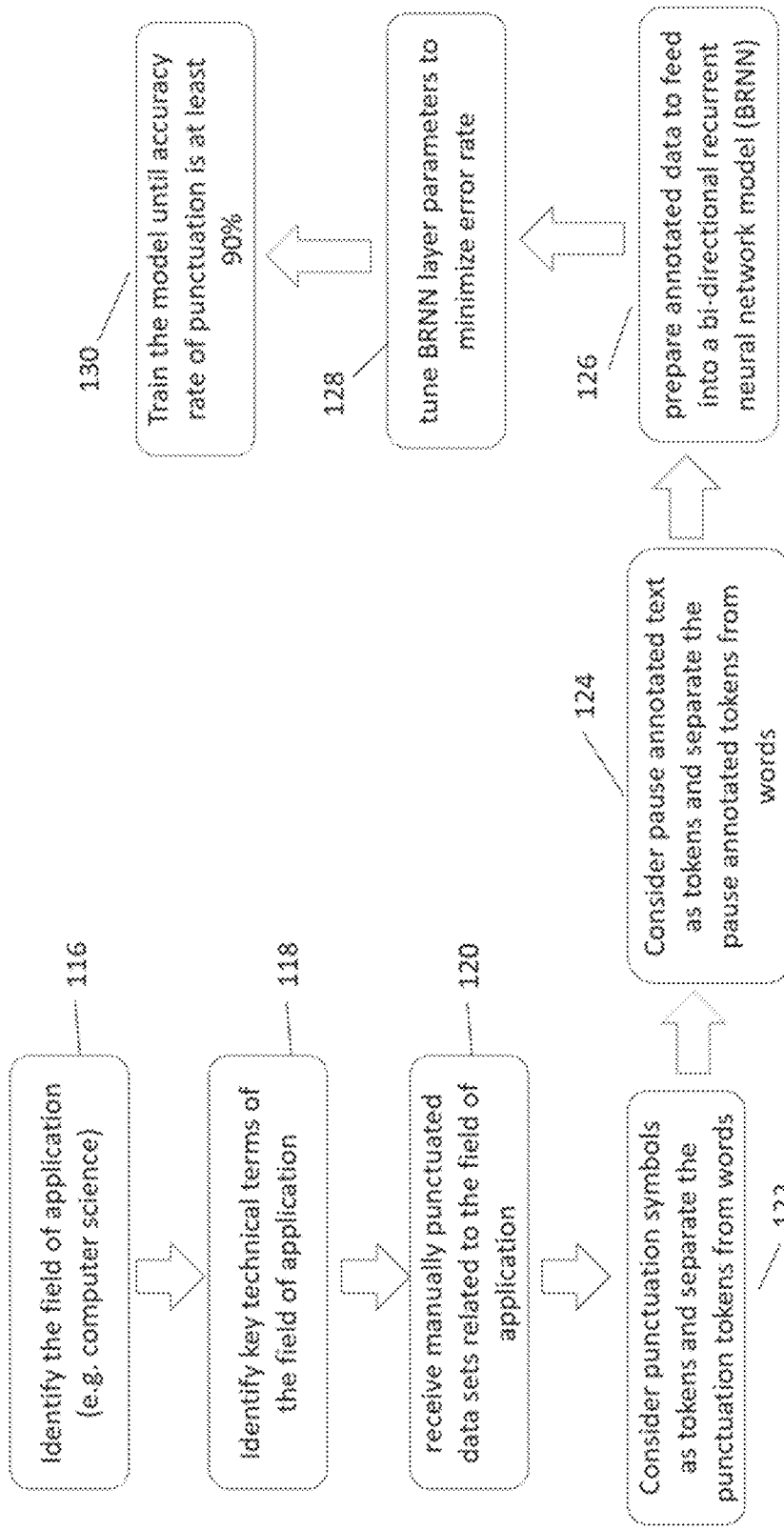
FIG. 14 depicts a flowchart for a second part of a machine assisted training process for punctuation according to an embodiment of the present invention.

FIG. 14 depicts a second stage of a machine assisted training process for punctuation. Steps 116, 118, 120, and 122 are similar to the first stage described above: identify field of application at step 116, identify key technical terms at step 118, receive manually punctuated data sets at step 120, and replace punctuation with tokens at step 122. A processed transcript file with customized tokens should be obtained. In this stage, prosodic features of the video such as pauses will be used to enhance the accuracy of training. At step 124 all audio pauses in the manually punctuated transcripts are replaced with pause tokens.

At step 126, annotated data is prepared to feed into a bi-directional recurrent neural network model. Related audio files of transcripts from stage 1 are stored in a high efficiency computer cluster. An extensive database of prosodic features is developed that describe pause, pitch, duration, and/or energy information of the audio signal. Other features may be included as well. Features that are highly correlated are identified and the feature space is reduced using grouping of similar features. For each audio file, a time stamp and duration of a reduced set of prosodic features are obtained. Using a hidden Markov model (HMM), lexical and prosodic features are combined to generate a classifier of speech boundaries to be used for segmentation.

Steps 128 and 130 are similar to stage 1. The neural network parameters are tuned to minimize error rate at step 128 and the model is trained until a desired accuracy is reached (for example, 90% accuracy) a step 130. The punctuated transcripts from stage 1 are then processed to add the prosodic feature boundaries. The boundary metadata is stored for each video transcript file. The original time stamps are added to the automatically punctuated transcripts with prosodic features. The time sentences are grouped into equally timed clusters (or paragraphs) and fed into a curated video delivery platform (e.g. cuvids.io).

Figure 15:
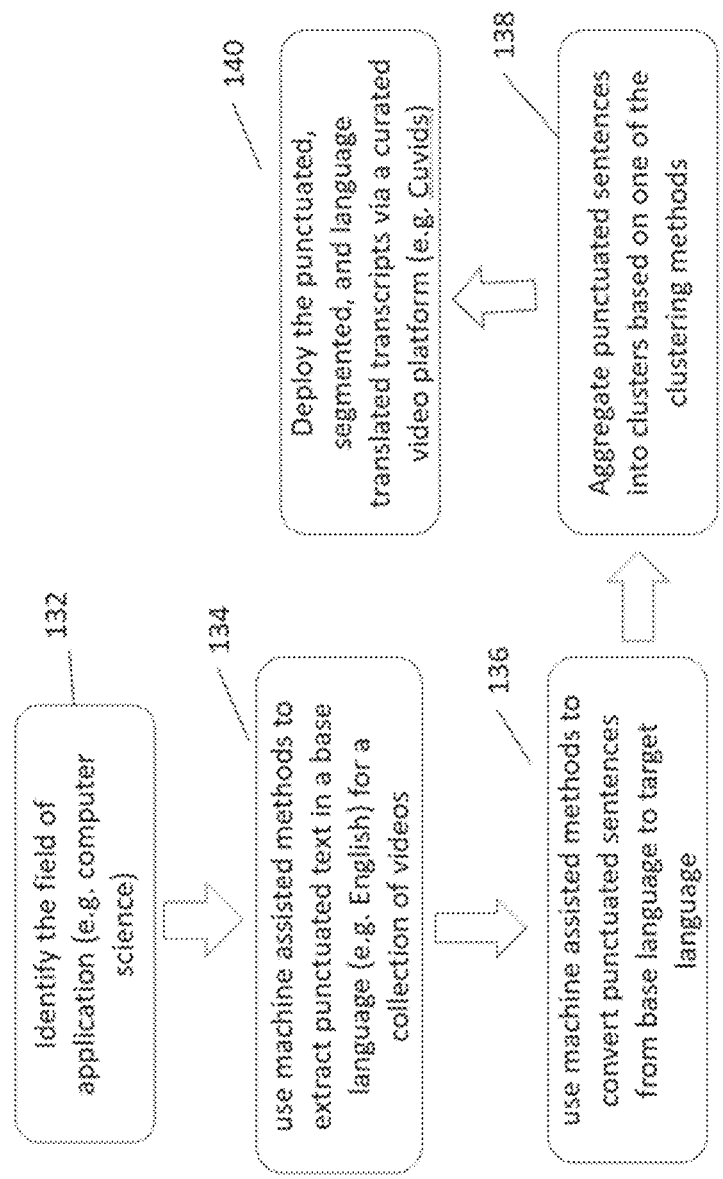
FIG. 15 depicts a flowchart for a conversion and delivery process for punctuation and segmentation in a foreign language according to an embodiment of the present invention.

FIG. 15 depicts a conversion and delivery process for punctuation and segmentation in a foreign language using base language processing. At step 132, the field of application and all its sub-fields are identified (similar to as described earlier). The main keywords in the field of application are also identified.

At step 134, text is punctuated using a base language (e.g. English) using the machine assisted methods described earlier. Then, at step 136, the punctuated text is converted from the base language (e.g. English) into a target language (e.g. Spanish) using the machine assisted methods.

At step 138, punctuated sentences are aggregated into clusters based on clustering methods to be described later. A synthetic audio from text is created using machine assisted methods in the target language with time stamps. The base language audio is replaced with the target language audio.

Figure 16:
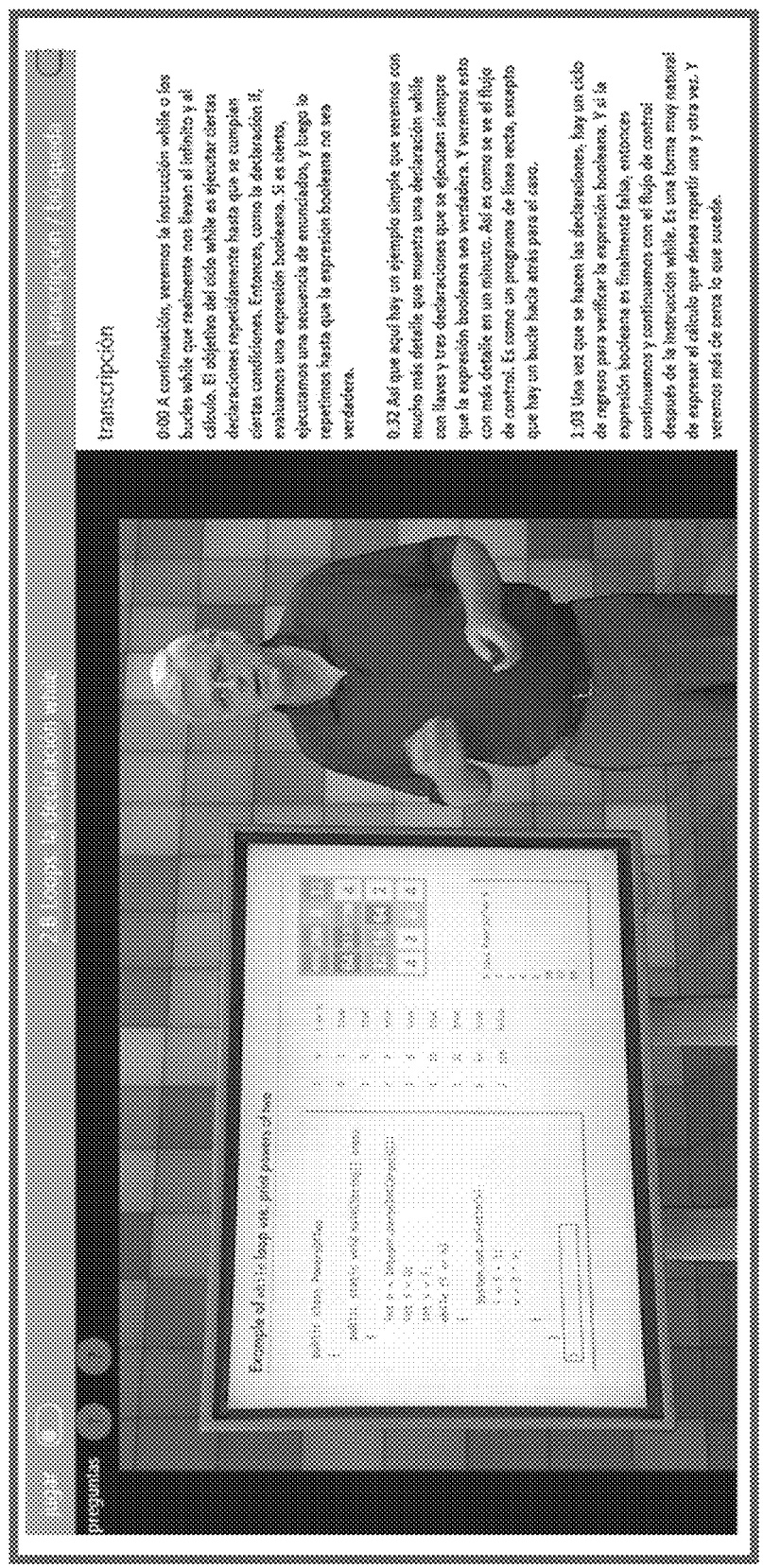
FIG. 16 depicts a screenshot of an automatically segmented video in a target language according to an embodiment of the present invention.

At step 140, time sentences are grouped into equally timed clusters (or paragraphs) and fed into a curated video delivery platform (e.g. cuvids.io). FIG. 16 depicts an example of an automatically segmented video in a target language (e.g. Spanish).

Figure 17:
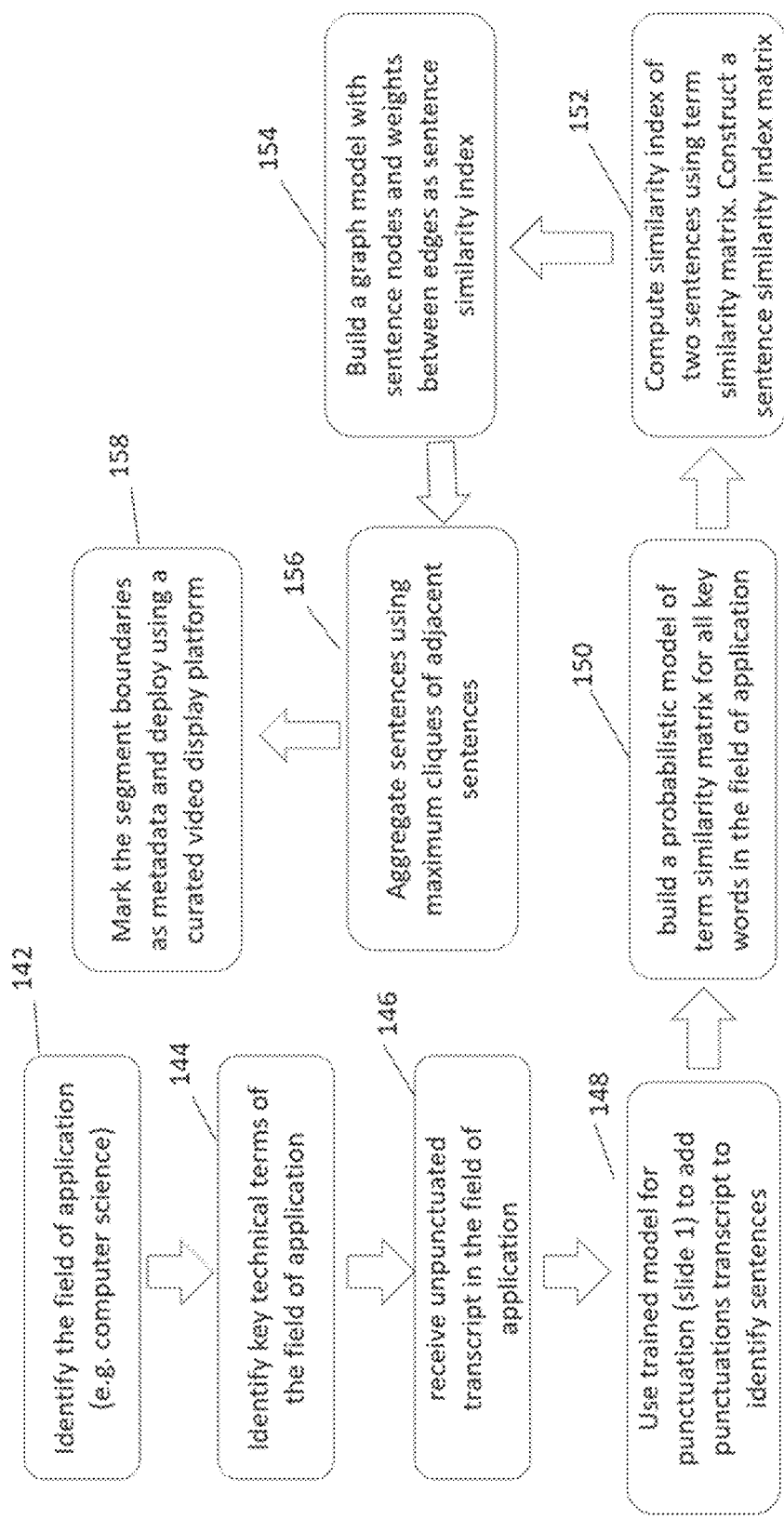
FIG. 17 depicts a flowchart for a machine assisted method for segmentation by punctuation according to an embodiment of the present invention.

FIG. 17 depicts a machine assisted method for segmentation by punctuation. At step 142, the field of application and all its sub-fields are identified, and at step 144, the key technical terms of the field of application are identified.

At step 146, unpunctuated transcripts are received using a machine assisted audio to text translation. At step 148, the trained model described in stage 1 above is used to automatically punctuate unpunctuated transcripts in order to identify sentences.

At step 150, a probabilistic model of a term similarity matrix is built using the corpus of unpunctuated transcripts from the field of application. At step 152, a probabilistic model of a sentence similarity matrix is built using the corpus of punctuated sentences from the field of application.

Figure 18:
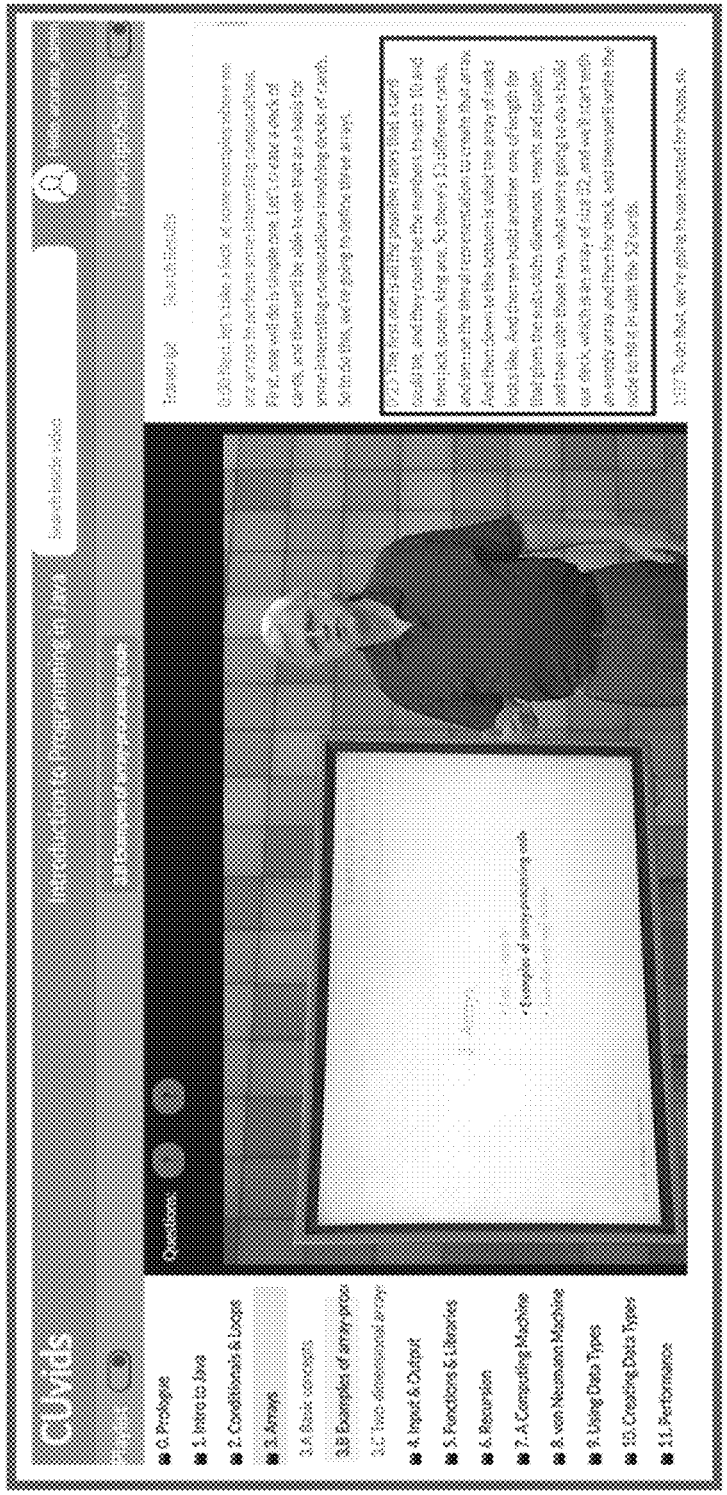
FIG. 18 depicts a screenshot of an automatically segmented video according to an embodiment of the present invention.

At step 154, a graph model is built with sentences as nodes and weighted edges based on the sentence similarity matrix. At step 156, sentence groups are aggregated using one or more maximum cliques graph clustering methods subject to a maximum threshold of total sentences per segment. At step 158, metadata is added for each cluster to punctuated and segmented transcripts of videos and the segmented transcripts are deployed using a curated video platform (e.g. cuvids.io). FIG. 18 depicts an example of an automatically segmented video.

Figure 19:
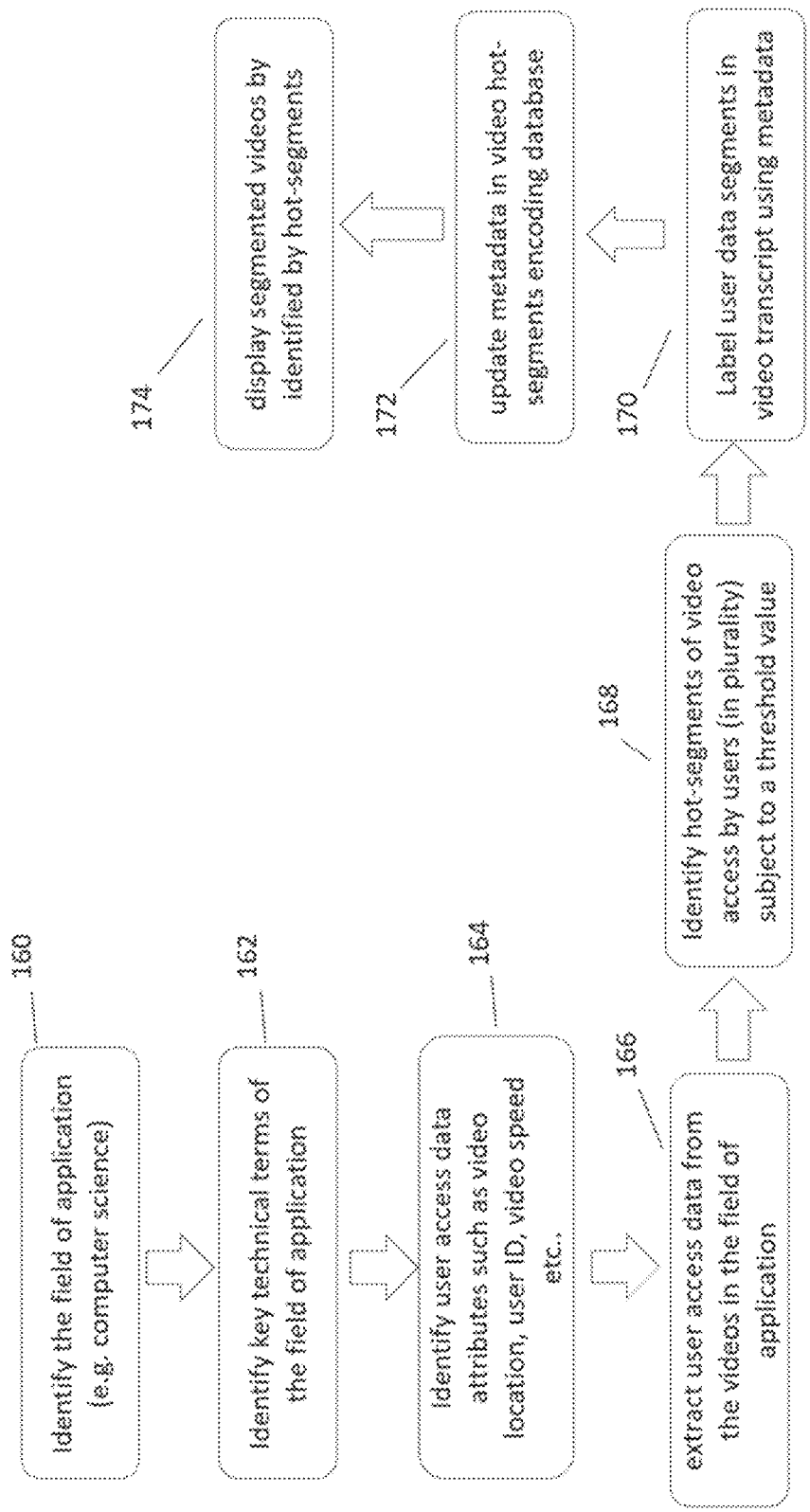
FIG. 19 depicts a flowchart for a machine assisted method for segmentation by user interaction data according to an embodiment of the present invention.

FIG. 19 depicts a machine assisted method for processing transcripts for segmentation by user interaction data. At step 160, the field of application and all its sub-fields are identified, and at step 162, the main keywords in the field of application are identified.

At step 164, highly granular user access data records (recorded in very small pre-determined time intervals) are identified where each record includes attributes such as video ID, video location, user ID, data and time, video speed, and/or polling rate, as nonlimiting examples. At step 166, all user access data records are extracted from a storage device used to store user access data information for a current period.

At step 168, hot segments of video (high frequency areas) accessed by users is identified subject to a threshold value. The user access density (total access as an integer) is computed for each t-second data record. The user access density for each sentence (e.g. a collection of words separated by punctuation comma, period, or semi-colon) is computed as a sum of user access density for t-second groups. Any t-second densities outside of a sentence boundary as defined by punctuation is removed.

At step 170, user data segments in video transcripts is labeled using metadata. Top m (where m is a hyper-parameter determined algorithmically or manually) adjacent sentence groups with the highest access density are grouped as a cluster. Boundaries for top n sentence groups are defined as a cluster. At step 172, metadata is added to each video database record of n sentence groups. Sentence groups with varying degrees of background color are marked based on access density. The clusters of highest user density are identified in each video transcripts.

Figure 20:
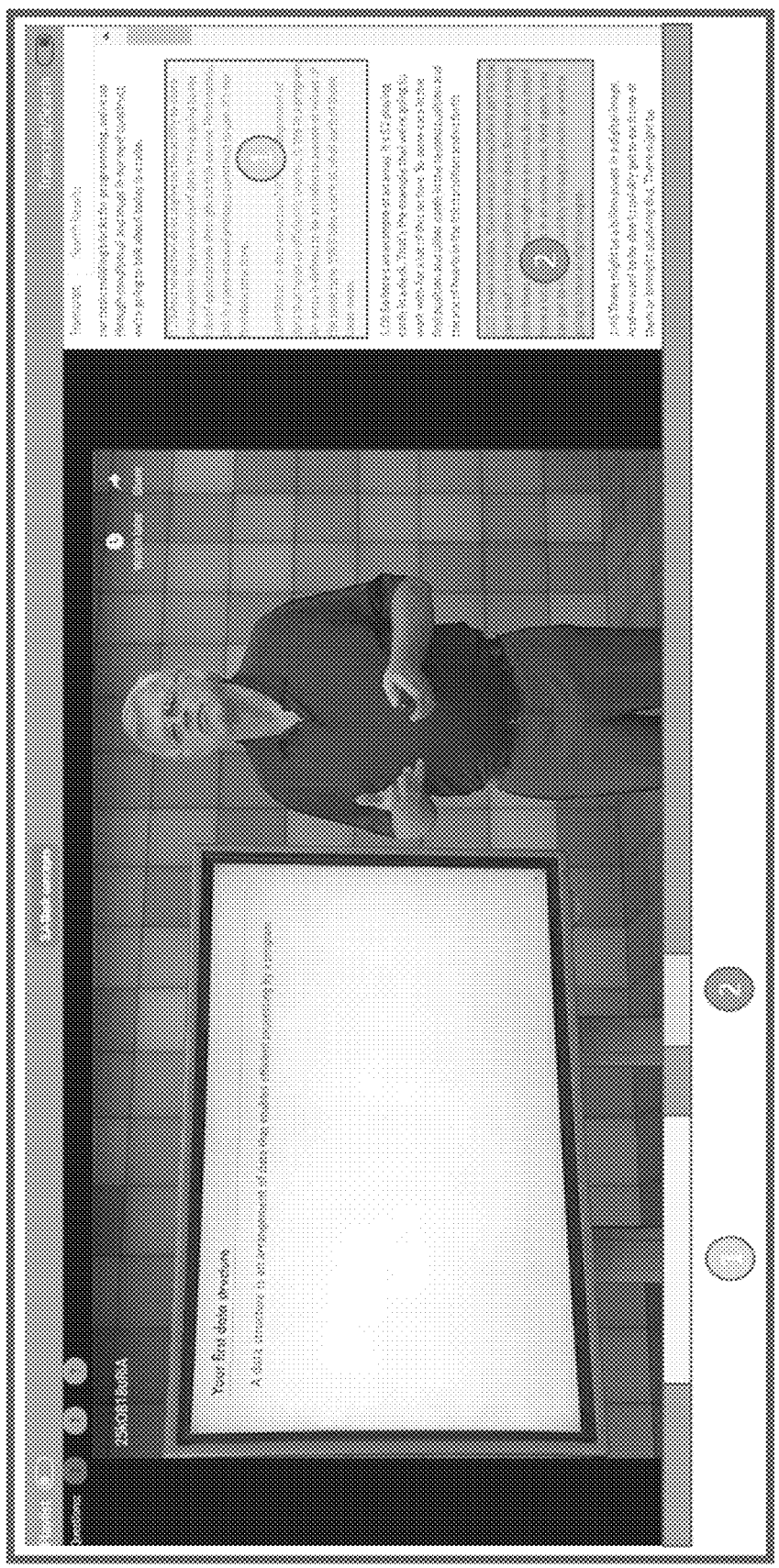
FIG. 20 depicts a screenshot of a user access data segmented video according to an embodiment of the present invention.

At step 174, marked clusters with segmented videos are delivered through a curated video platform. FIG. 20 depicts an example of a user access data segmented video. The segments are identified in text and in the video timeline.

Figure 21:
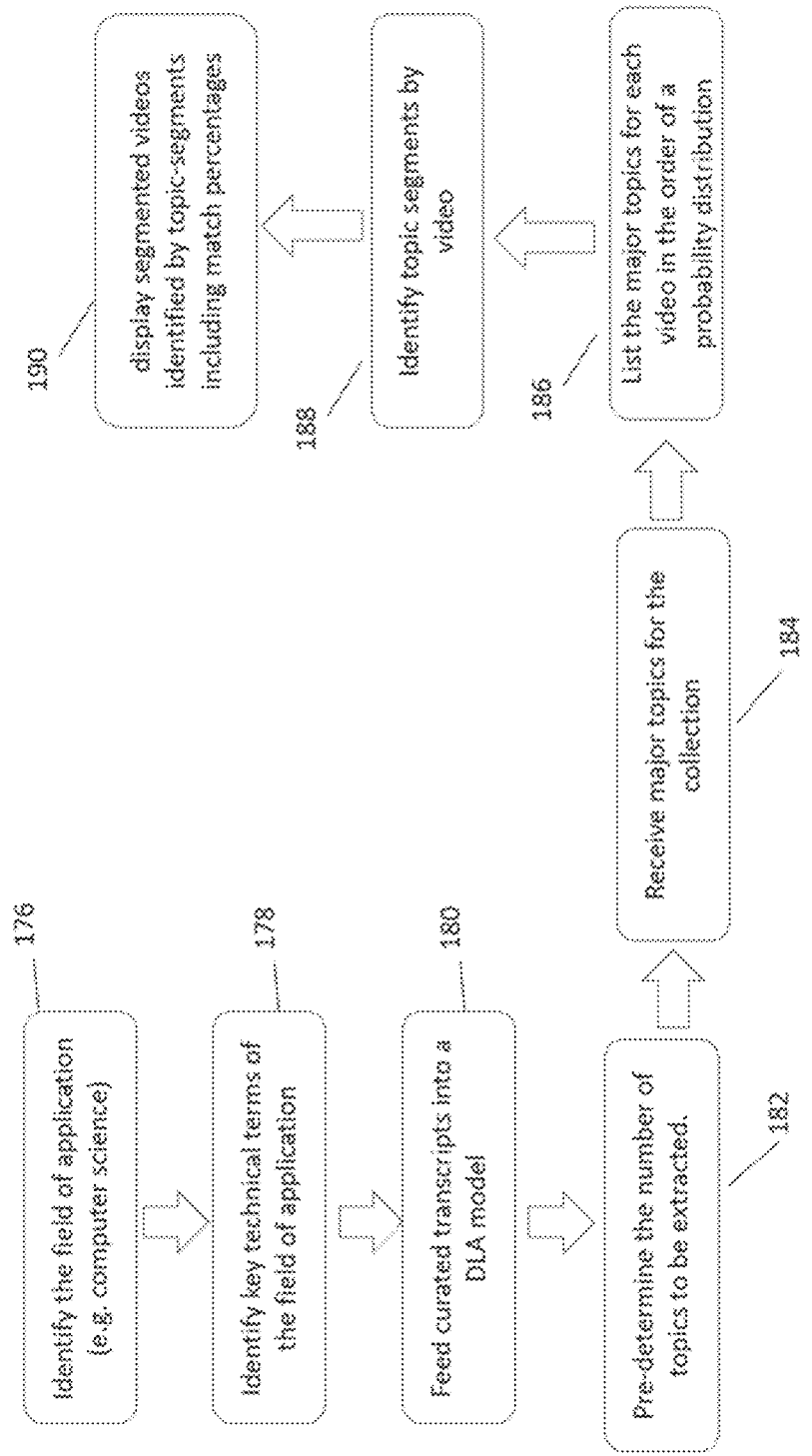
FIG. 21 depicts a flowchart for a training process for segmentation by topic modeling according to an embodiment of the present invention.

FIG. 21 depicts a machine assisted method for segmentation by topic modeling. At step 176, the field of application is identified, and at step 178, the key technical terms of the field of application are identified.

Figure 22:
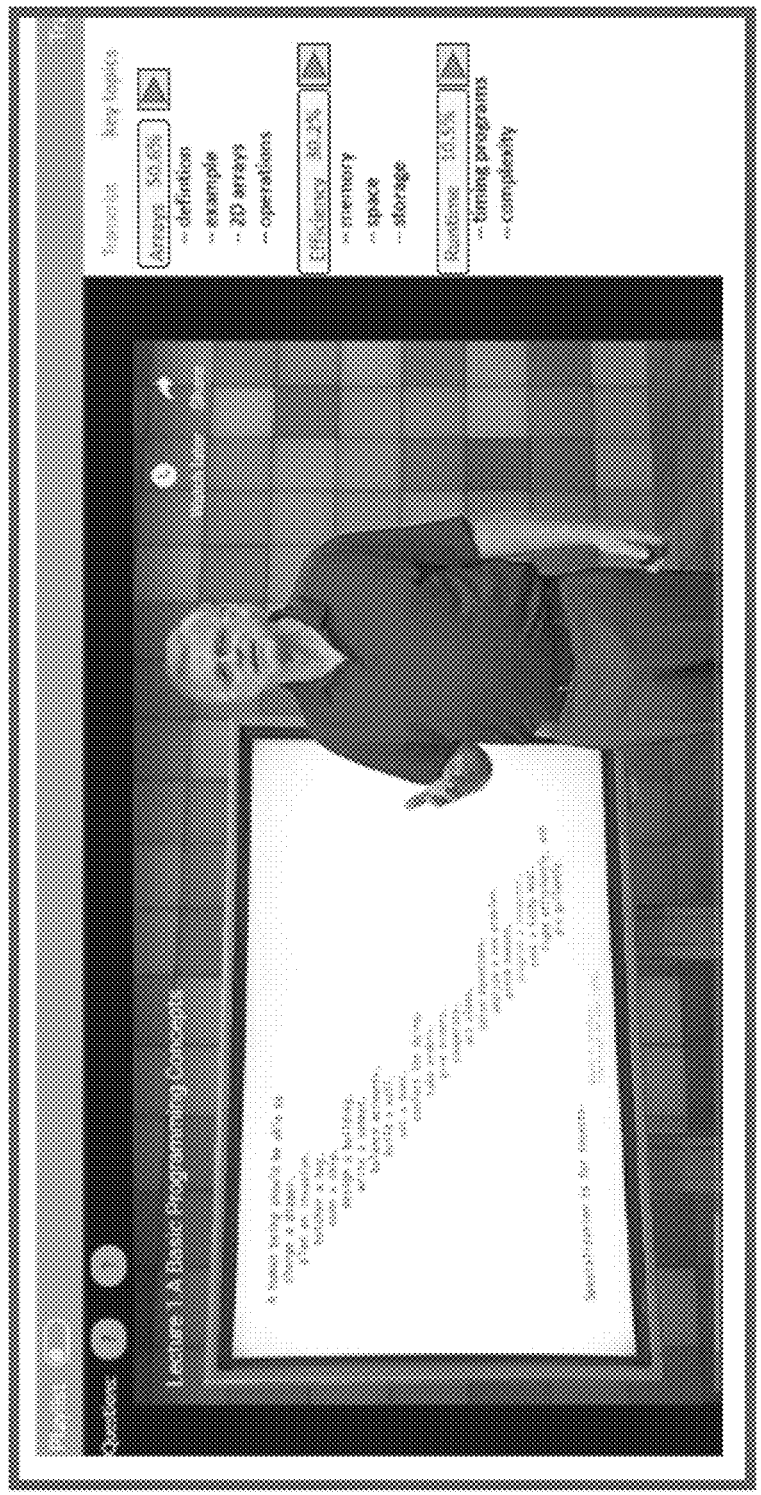
FIG. 22 depicts a screenshot of an automated topic segmented video according to an embodiment of the present invention.

At step 180, curated transcripts in a collection are fed into a Dirichlet Latent Allocation (DLA) model. At step 182, the number of topics to be extracted is pre-determined. At step 184, the major topics for the collection are received using machine assisted methods. At step 186, the major topics in each video are listed in the order of a probability distribution. At step 188, metadata for major topics for each video is stored in a database and topic segments are identified by video. At step 190, segmented videos identified by topic segments are displayed. FIG. 22 is an example of an automatically topic segmented video. The topics and subtopics are clickable for immediate access to related video segments.

Figure 23:
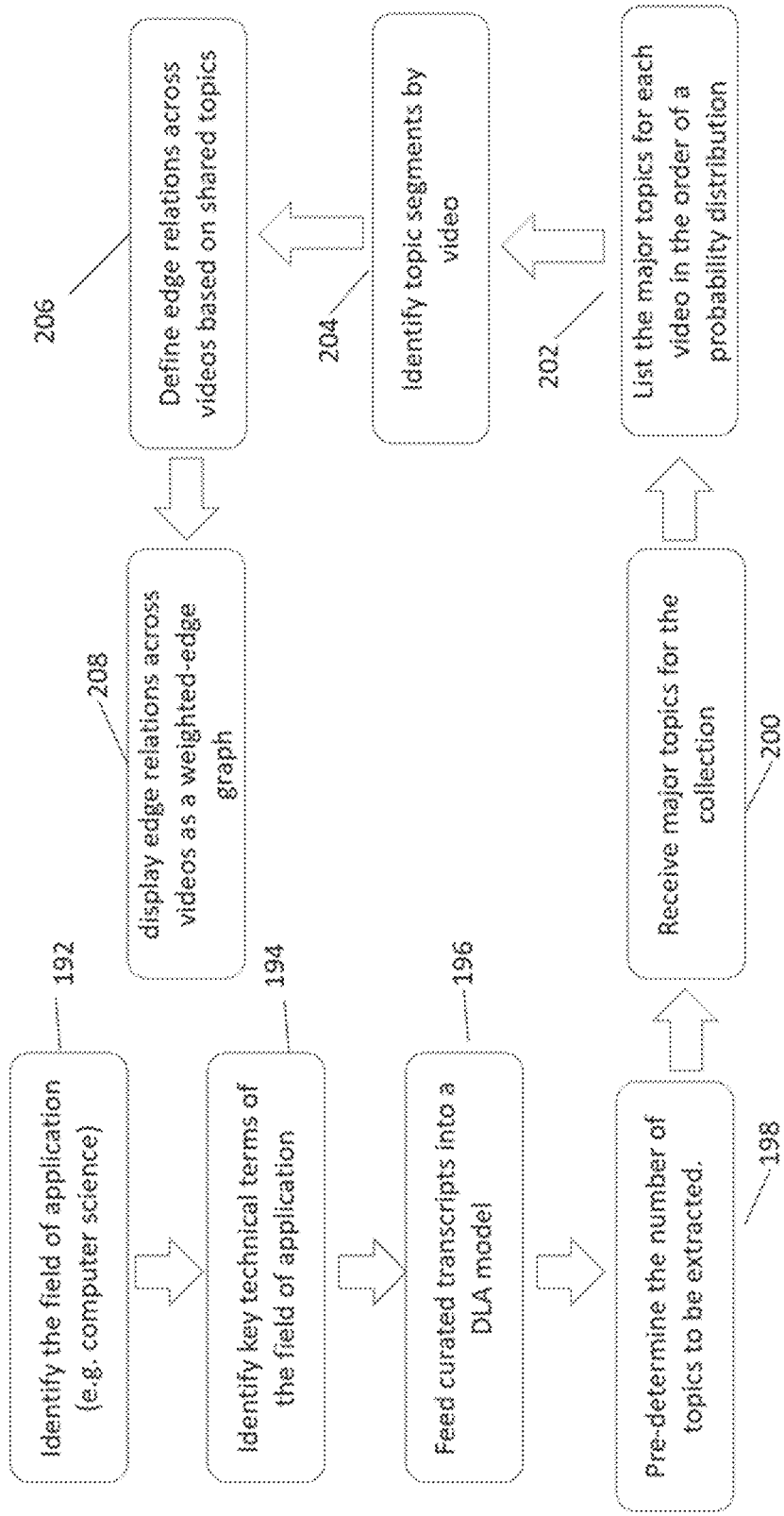
FIG. 23 depicts a flowchart of a machine assisted method for segmentation by topic modeling across videos according to an embodiment of the present invention.

FIG. 23 depicts a machine assisted method for segmentation by topic modeling across a video collection. At step 192, the field of application and all its sub-fields are identified, and at step 194, the main keywords in the field of application are identified. Steps 196, 198, 200, 202, and 204 are the same as in FIG. 21 described prior.

Figure 24:
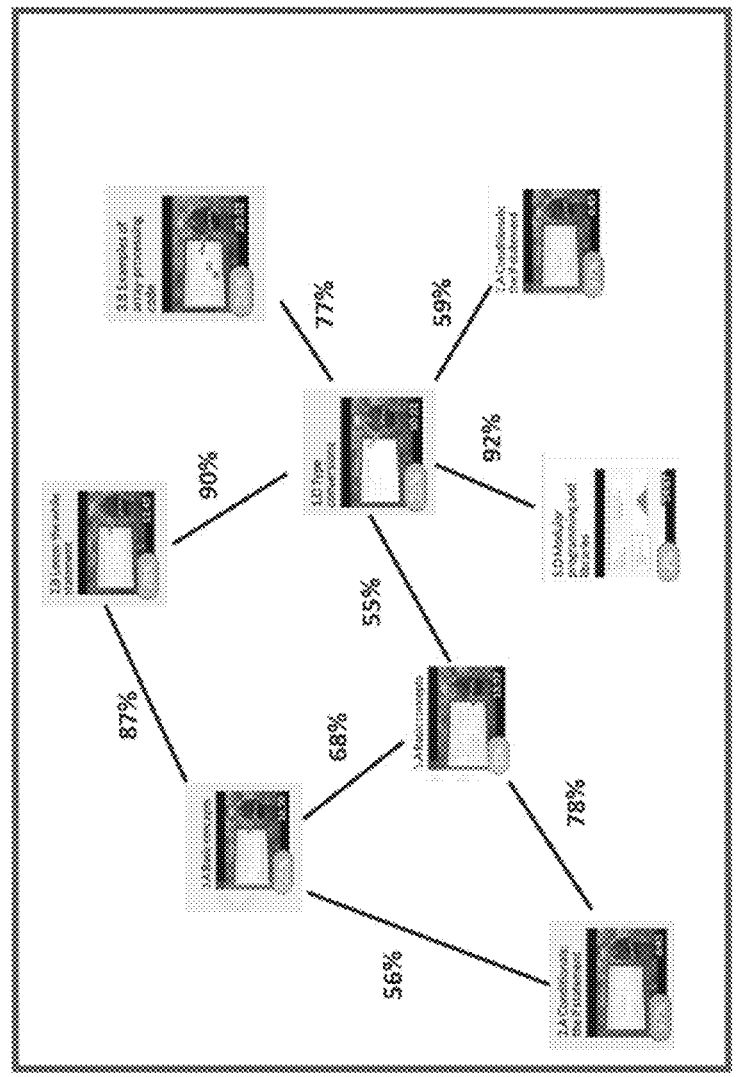
FIG. 24 depicts an edge-weighted graph showing video relations based on topic modeling according to an embodiment of the present invention.
Figure 25:
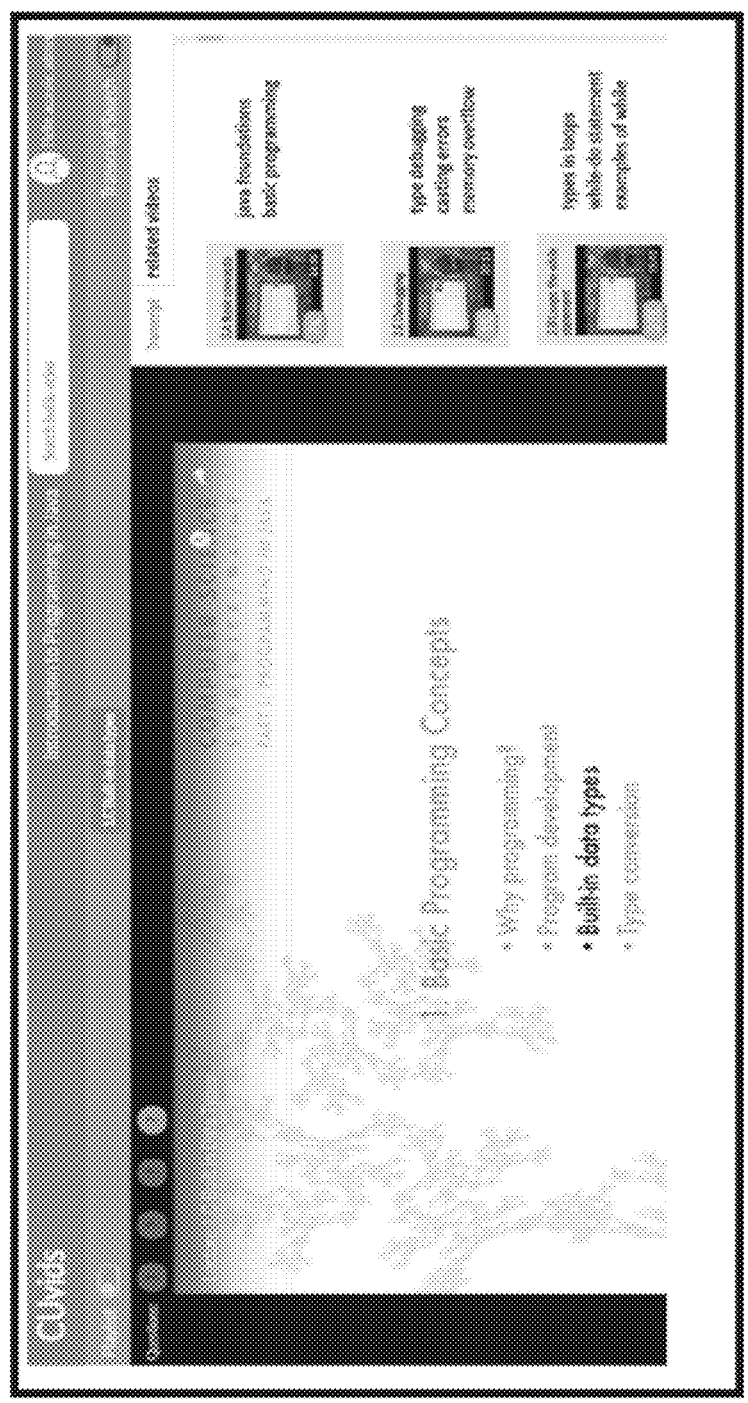
FIG. 25 depicts a screen shot of a related videos segmentation based on topic modeling according to an embodiment of the present invention.

At step 206, the edge relations across videos are defined based on shared topics, and at step 208, edge relations across videos are displayed as a weighted edge graph. The definitions are based on a threshold of similarity. The topic probability density for each video is computed and overlapping topics across videos in the collection are found. A weighted edge between two videos is added, if similar topics (subject to a threshold) are present among two or more videos. The graph structure is stored in a database table and related videos to each video are displayed by extracting metadata from the graph structure using a curated video display platform (e.g. cuvids.io). FIG. 24 depicts an example of an edge-weighted graph depicting video relations based on topic modeling. FIG. 25 depicts an example of a user interface for video segmentation based on topic modeling. For each video, users are able to find other related videos in the collection with similar topics.

Figure 26:
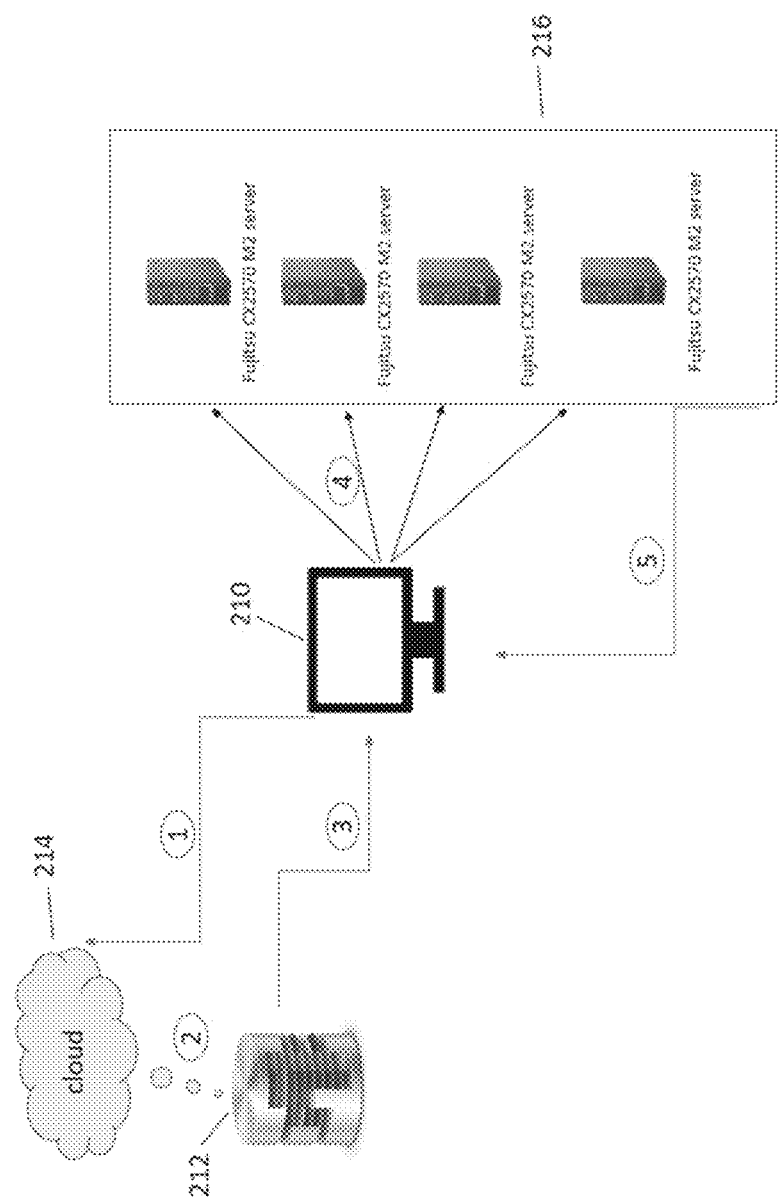
FIG. 26 depicts a hardware configuration used for training of a machine assisted model according to an embodiment of the present invention.

FIG. 26 depicts a hardware configuration used for training of a machine assisted model. The configuration includes a training coordination machine 210. The machine 210 may be implemented in a variety of configurations including general computing devices such as but not limited to desktop computers, laptop computers, tablets, network appliances, and the like. The machine 210 includes one or more processors such as but not limited to a central processing unit (CPU), a graphics processing unit (GPU), or a field programmable gate array (FPGA) for performing specific functions and memory for storing those functions. For instance, the machine 210 may include dual 14-core 2.46 GHz Intel Xeon E5 2680 v4 processors with 384 GB RAM running a Springdale distribution of Linux. The machine 210 is connected to a database 212, which may include a cloud component 214, for storing manually punctuated transcripts filtered by domain of training. The machine 210 is also connected to one or more high performance computers 216, for example, one or more Fujitsu CS2570 M2 servers for preparing a trained model as a binary file, or using GPU cluster or Tensor Processing Units (TPU) cluster for intense machine training of the model.

Figure 27:
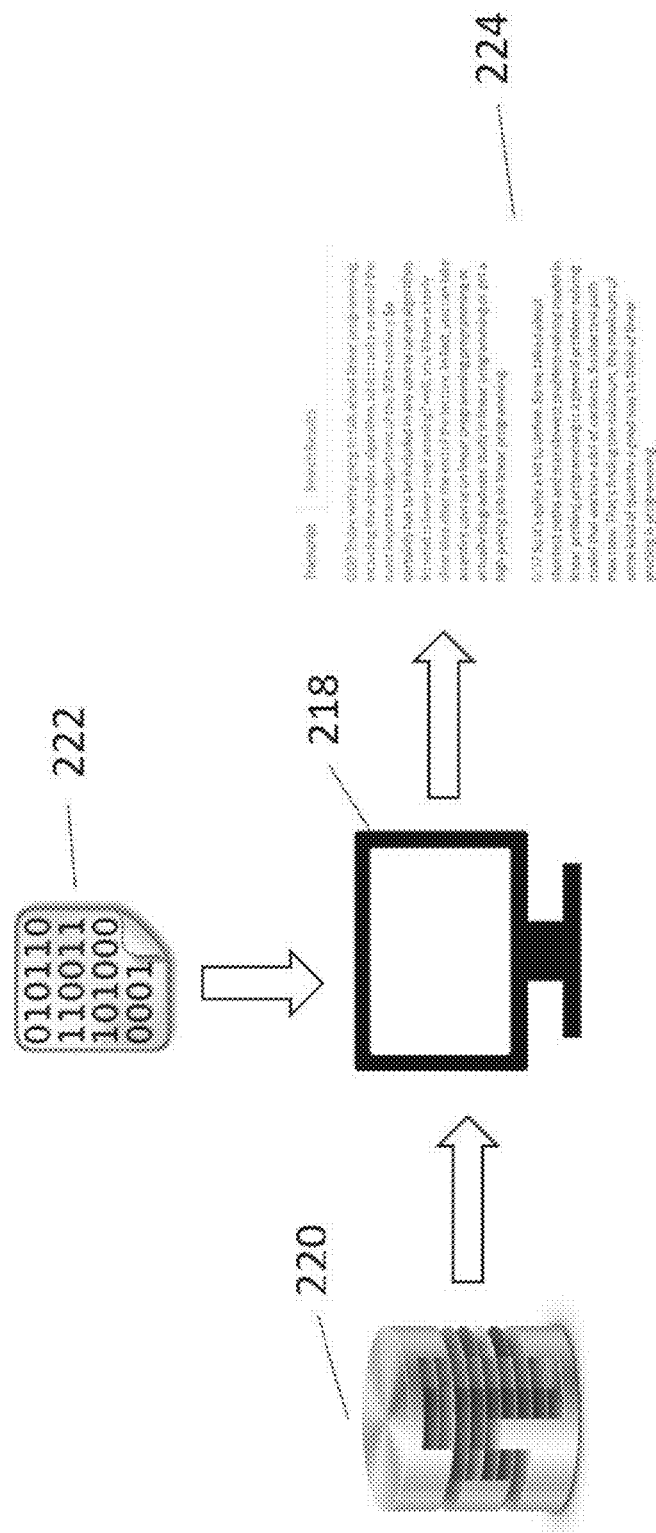
FIG. 27 depicts a software/hardware configuration for applying a machine assisted model according to an embodiment of the present invention.

FIG. 27 depicts a software/hardware configuration for applying a machine assisted model. The configuration includes a translation machine 218. The machine 218 may be implemented in a variety of configurations including general computing devices such as but not limited to desktop computers, laptop computers, tablets, network appliances, and the like. The machine 218 may also be implemented as a mobile device such as but not limited to a mobile phone, smart phone, smart watch, or tablet computer. The machine 218 includes one or more processors such as but not limited to a central processing unit (CPU), a graphics processing unit (GPU), or a field programmable gate array (FPGA) for performing specific functions and memory for storing those functions. Unpunctuated text from a domain of interest 220 and a trained binary model 222 are input into the translation machine 218 and the translation machine outputs a punctuated text from a domain of interest 224.

Figure 28:
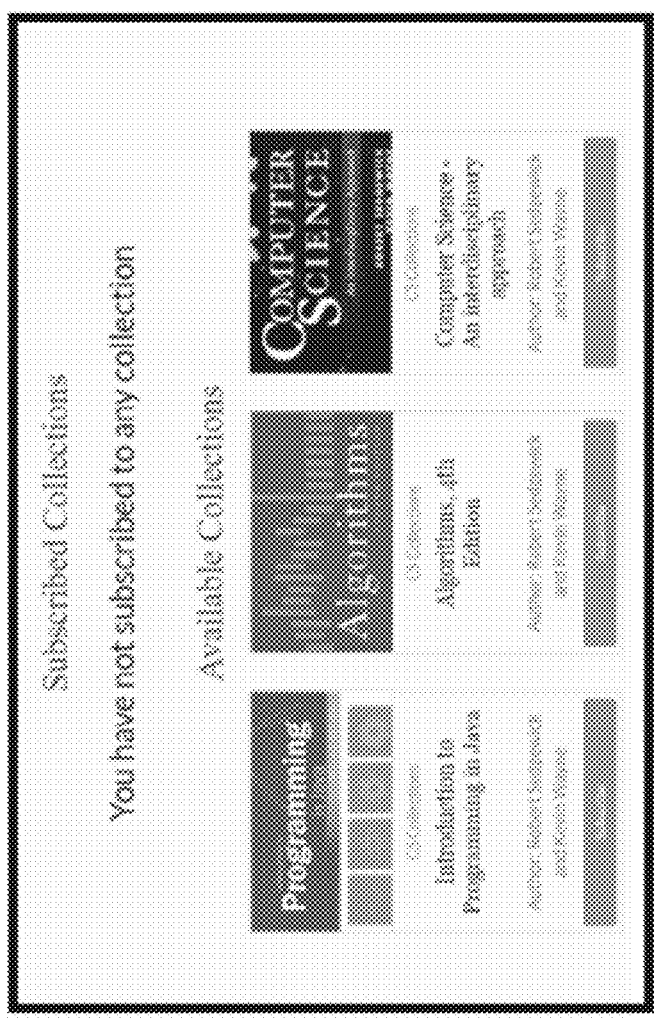
FIG. 28 depicts a screenshot of automatically curated video collections according to an embodiment of the present invention.
Figure 29:
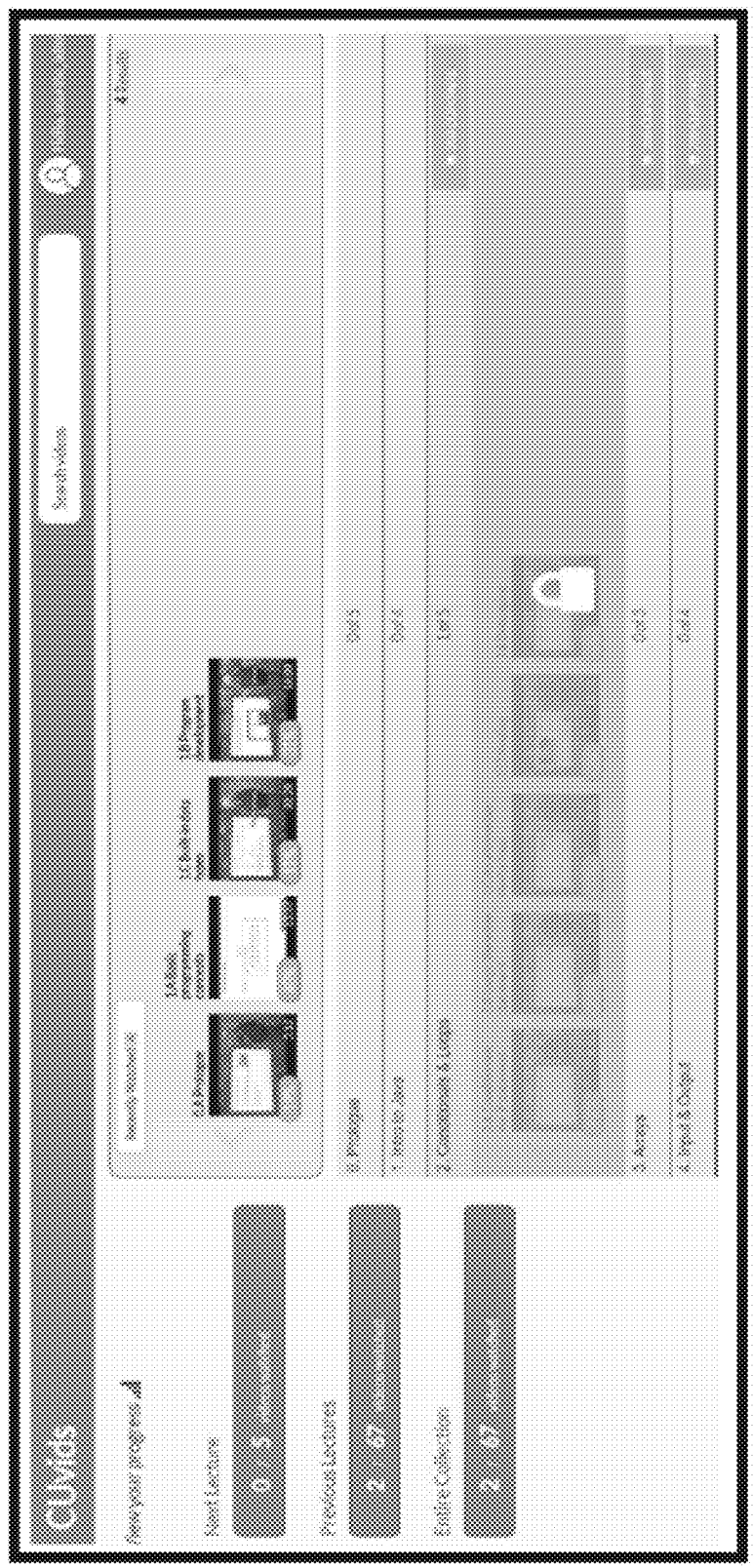
FIG. 29 depicts a screenshot of modules within collections where locked modules can be purchased according to an embodiment of the present invention.
Figure 30:
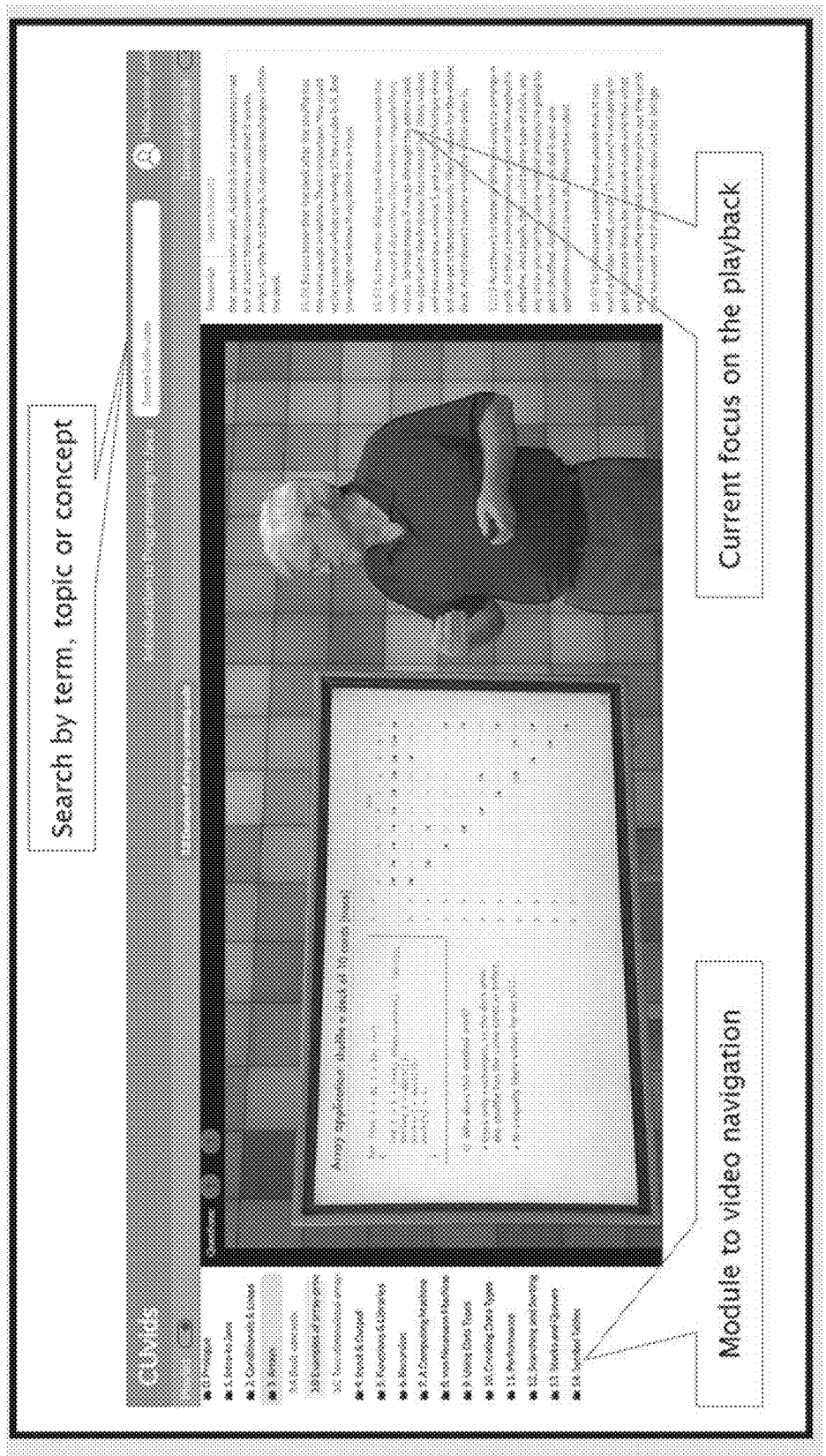
FIG. 30 depicts a screenshot of a navigational structure of the video interface according to an embodiment of the present invention.
Figure 31:
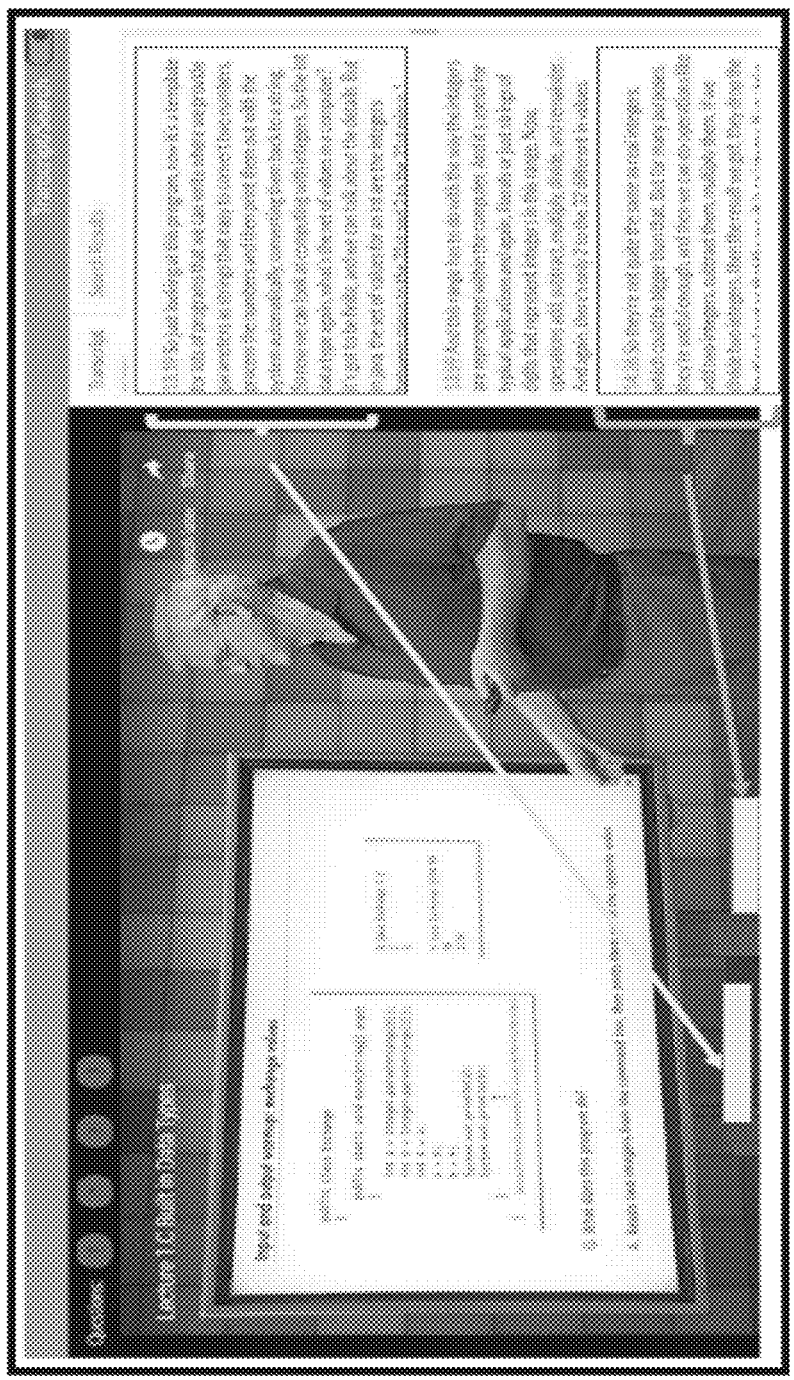
FIG. 31 depicts a screenshot of a machine segmented text-based navigation with marked segments according to an embodiment of the present invention.
Figure 32:
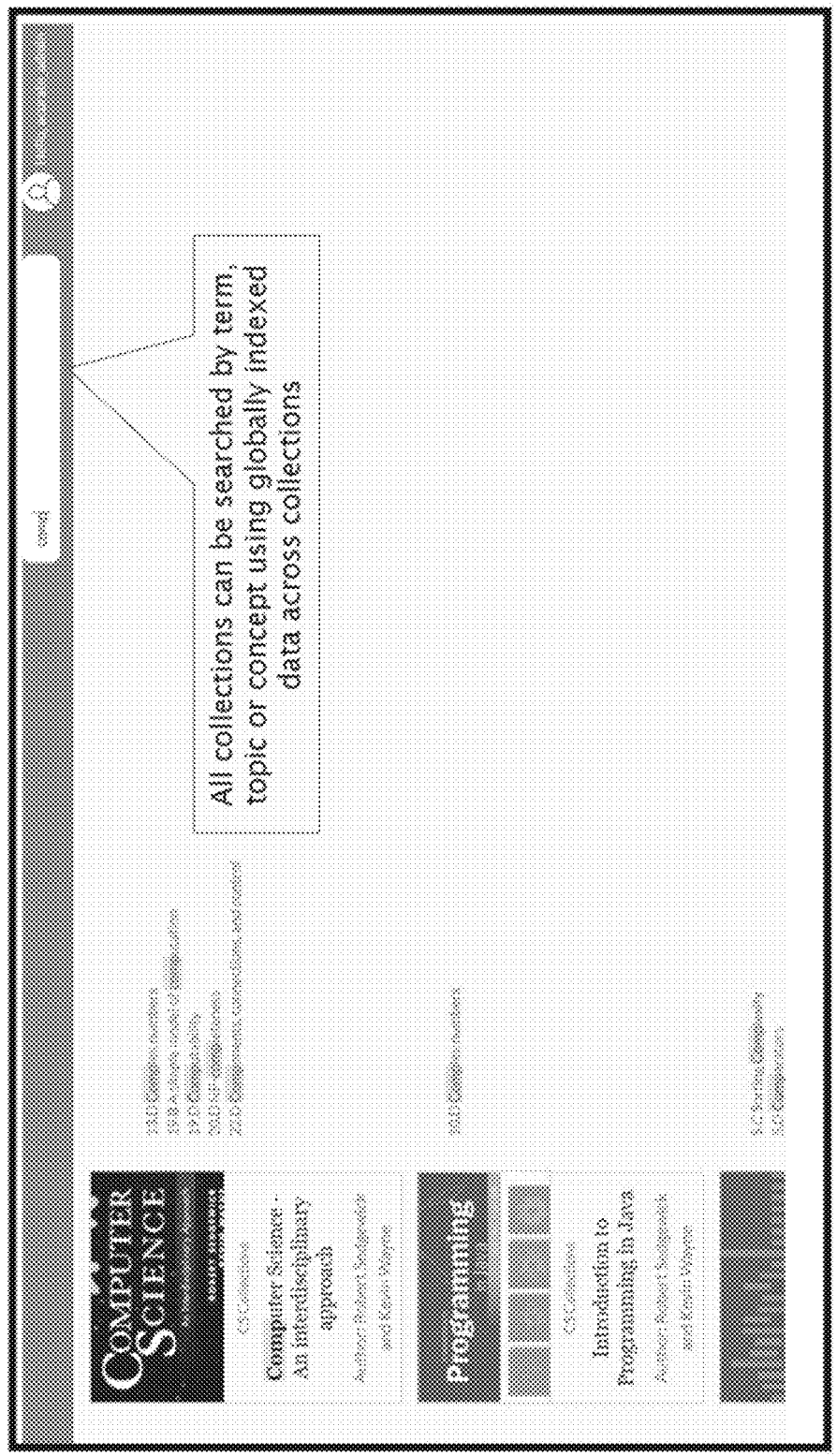
FIG. 32 depicts a screenshot of a search at a collection level that returns all matching collections to term, topic, or concept according to an embodiment of the present invention.
Figure 33:
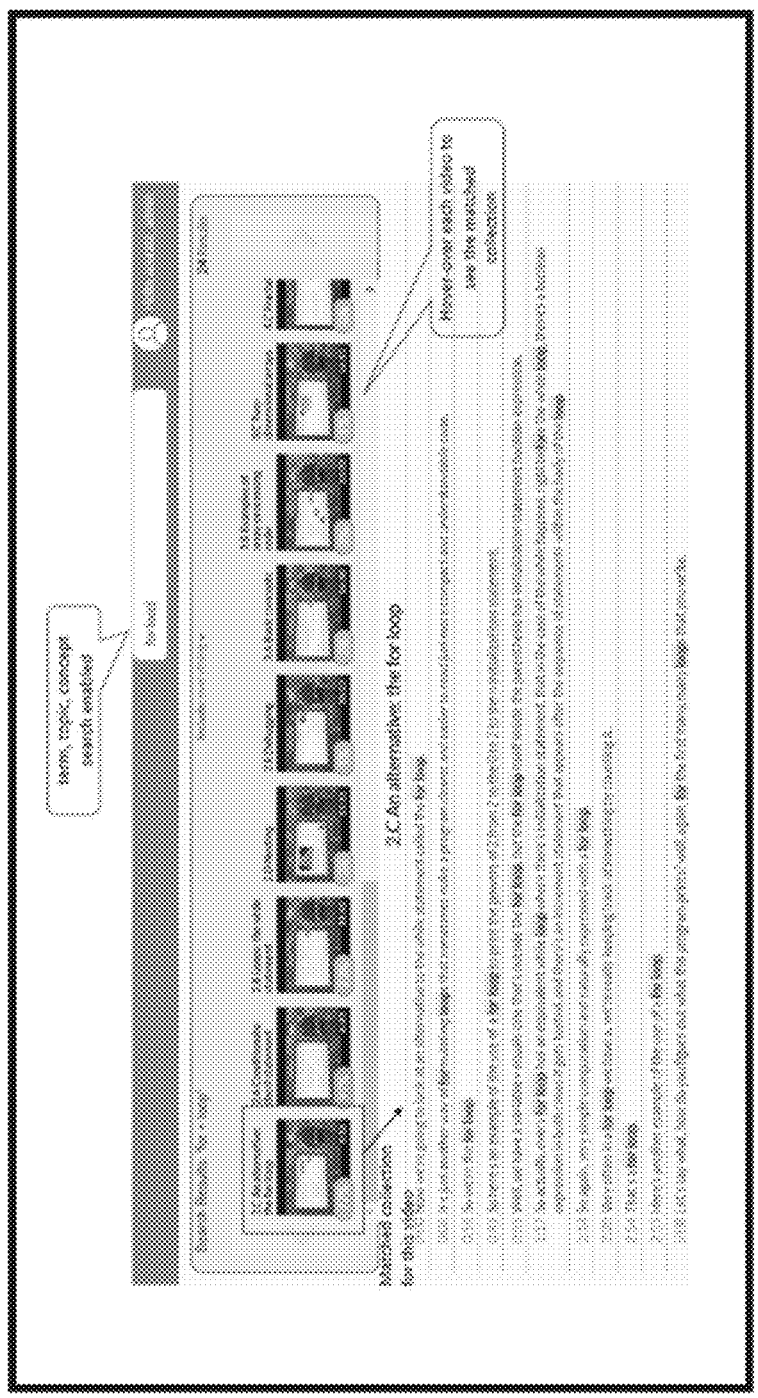
FIG. 33 depicts a screenshot of a search at a collection level that returns all time stamps of matching segments for all videos in the collection according to an embodiment of the present invention.
Figure 34:
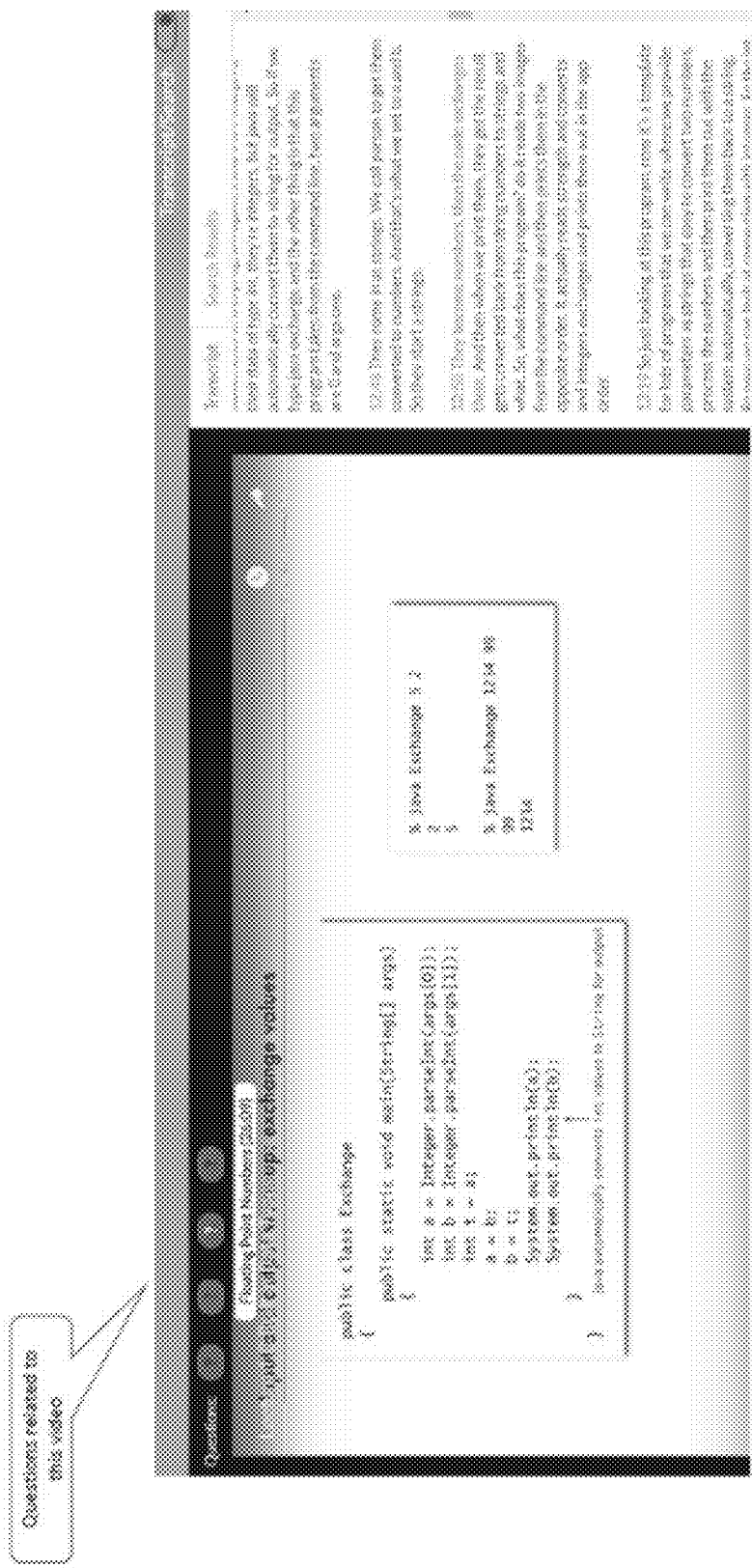
FIG. 34 depicts a screenshot of an embedded time-stamped and titled assessment for each video according to an embodiment of the present invention.
Figure 35:
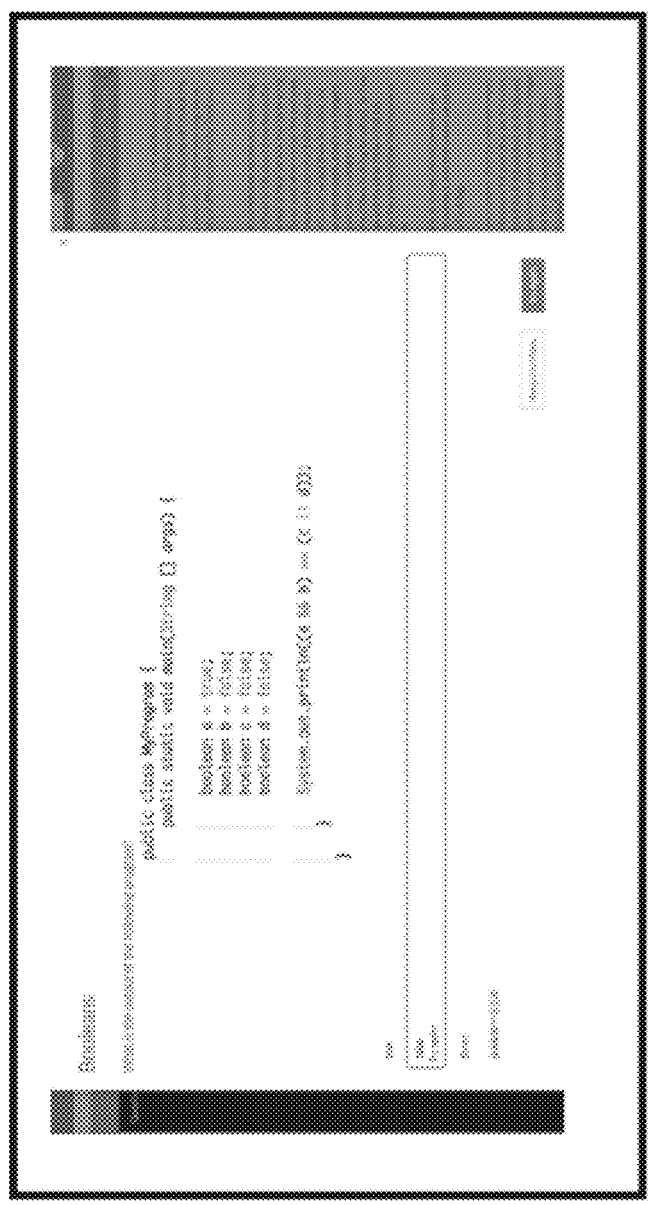
FIG. 35 depicts a screenshot of an automated presentation of assessments at the time stamp according to an embodiment of the present invention.

FIGS. 28-35 depicts various views and features of novel user interface elements of the platform for delivering curated videos. FIG. 28 depicts automatically curated video collections. FIG. 29 depicts modules within collections where locked modules can be purchased using a novel micropayment process for unlocking modules. FIG. 30 depicts an exemplary navigational structure of the video interface. FIG. 31 depicts a machine segmented text-based navigation with marked segments mapping to specific time segments in the video timeline. FIG. 32 depicts an advanced search at all collection level that returns all matching collections to term, topic, or concept. FIG. 33 depicts a search at a specific collection level that returns all time stamps of matching segments for all videos in the specific collection. FIG. 34 depicts an embedded time-stamped and titled assessment for each video. FIG. 35 depicts an automated presentation of assessments and auto-grading of responses with feedback at the time stamp.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for training a neural network to segment video content based on text clustering modules, the method comprising:
   identifying a field of application and a plurality of main keywords in the field of application for the video content;
   extracting at least one transcript of the video content from the field of application based on the plurality of main keywords;
   replacing all punctuation in the transcript with custom punctuation tokens;
   iteratively training the neural network using the transcript with custom punctuation tokens until a desired accuracy is obtained to receive a trained model for automated punctuation;
   replacing all prosodic features of the video content in the transcript with custom prosodic feature tokens; and
   iteratively training the neural network using the trained model for automated punctuation and the transcript with custom prosodic feature tokens until to desired accuracy is obtained to receive a trained model for automated punctuation and prosodic features.

2. The method of claim 1, further comprising identifying at least one sub-field of the field of application.

3. The method of claim 1, wherein the neural network comprises a bidirectional recurrent neural network.

4. The method of claim 1, further comprising converting text of the transcript into lower case characters except the custom tokens.

5. The method of claim 1, further comprising modifying hyperparameters as the neural network is iteratively trained using the transcript with custom punctuation tokens.

6. The method of claim 5, wherein the hyperparameters comprise data size, number of hidden layers, and learning rate.

7. The method of claim 1, wherein the prosodic features comprise pause, pitch, duration, and energy information of an audio signal.

8. A method for machine-learning based segmentation of video content, comprising:
   identifying a field of application for the video content;
   generating an automated transcription of the video content;
   automatically punctuating the automated transcript using a trained neural network to identify a plurality of sentences in the automated transcript;
   generating a probabilistic model of a sentence similarity matrix based on proximity of a plurality of punctuated sentences from the field of application;
   generating a graph model with the plurality of punctuated sentences as nodes and weighted edges based on the sentence similarity matrix;
   aggregating the plurality of punctuated sentences into a plurality of segments based on the generated graph model subject to a maximum threshold of total sentences per segment; and
   incorporating the plurality of segments into the video content to generate segmented video content.

9. The method of claim 8, wherein each segment of the plurality of segments is about 2-5 minutes in length.

10. The method of claim 8, further comprising hosting the segmented video content using a curated video platform.

11. The method of claim 8, further comprising generating a search index based on the segmented video content.

12. The method of claim 8, further comprising converting the plurality of sentences in the automated transcript from a base language to a target language.

13. The method of claim 8, further comprising aggregating the plurality of punctuated sentences into a plurality of segments based on user interaction data, wherein each segment of the plurality of segment is adaptively determined by the user interaction data.

14. The method of claim 8, further comprising aggregating the plurality of punctuated sentences into a plurality of segments based on topic modeling data.

15. A system for machine-learning based segmentation of video content, comprising:
   one or processors on a curated video platform for hosting the video content, the one or more processors configured to:
   identify a field of application for the video content;
   generate an automated transcription of the video content;
   automatically punctuate the automated transcript using a trained neural network to identify a plurality of sentences in the automated transcript;
   generate a probabilistic model of a sentence similarity matrix based on proximity of a plurality of punctuated sentences from the field of application;
   generate a graph model with the plurality of punctuated sentences as nodes and weighted edges based on the sentence similarity matrix;
   aggregate the plurality of punctuated sentences into a plurality of segments based on the generated graph model subject to a maximum threshold of total sentences per segment; and
   incorporate the plurality of segments into the video content to generate segmented video content.

16. The system of claim 15, wherein the trained neural network comprises a bidirectional recurrent neural network.

17. The system of claim 15, wherein the processors are further configured to generate a search index based on the segmented video content.

18. The system of claim 15, wherein the processors are further configured to convert the plurality of sentences in the automated transcript from a base language to a target language.

19. The system of claim 15, wherein the processors are further configured to aggregate the plurality of punctuated sentences into a plurality of segments based on user interaction data.

20. The system of claim 15, wherein the processors are further configured to aggregate the plurality of punctuated sentences into a plurality of segments based on topic modeling data to be incorporated into a user interface for topic presentation.

* * * * *